(12) United States Patent
Kazemi Rad et al.

(10) Patent No.: US 12,177,503 B2
(45) Date of Patent: Dec. 24, 2024

(54) PREDICTIVE MEASUREMENT OF END-USER CONSUMPTION OF SCHEDULED MULTIMEDIA TRANSMISSIONS

(71) Applicant: Gracenote, Inc., Emeryville, CA (US)

(72) Inventors: Melissa Kazemi Rad, Elmsford, NY (US); Tal Kedar, Brooklyn, NY (US); Matteo Zanotto, Verona (IT); Garrett Mooney, Pittsburgh, PA (US); Sritanu Chakraborty, West Bengal (IN); Dominic Bryan Edwards, Brooklyn, NY (US)

(73) Assignee: GRACENOTE, INC., New York, NY (US)

( * ) Notice: Subject to any disclaimer, the term of this patent is extended or adjusted under 35 U.S.C. 154(b) by 0 days.

(21) Appl. No.: 18/136,095

(22) Filed: Apr. 18, 2023

(65) Prior Publication Data
US 2024/0121457 A1    Apr. 11, 2024

Related U.S. Application Data

(60) Provisional application No. 63/476,831, filed on Dec. 22, 2022, provisional application No. 63/377,565, filed on Sep. 29, 2022.

(51) Int. Cl.
*H04N 21/25* (2011.01)
*H04N 21/24* (2011.01)
(Continued)

(52) U.S. Cl.
CPC ....... *H04N 21/251* (2013.01); *H04N 21/2407* (2013.01); *H04N 21/252* (2013.01);
(Continued)

(58) Field of Classification Search
CPC ............. H04N 21/251; H04N 21/2407; H04N 21/252; H04N 21/25883; H04N 21/25891; H04N 21/26241
See application file for complete search history.

(56) References Cited

U.S. PATENT DOCUMENTS 11,481,788 B2 * 10/2022 Pradeep ............. G06Q 30/0202
11,966,894 B2 * 4/2024 Kozlowski, III ......... H04L 9/32
(Continued)

*Primary Examiner* — Joshua D Taylor
(74) *Attorney, Agent, or Firm* — MCDONNELL BOEHNEN HULBERT & BERGHOFF LLP

(57) ABSTRACT

Methods and systems for determining projected amounts of viewing time of a TV program by end-users are disclosed. Data including end-user type, a TV program descriptor, TV network, and start time of transmission may be received. End-users may be identified by end-user type. A machine-learning model applied to the data and viewing history data may generate parameters for determining how much of the TV program they are each expected to view during a sequence of time intervals. For each end-user, the parameters may be applied to make a determination of temporal-fraction values of the TV program the end-user is expected to view during the time interval, and for each time interval, conditioning values used to condition the determination for the next time interval. Projected subtotals of viewing time may be determined, based on the temporal-fraction values. A projected total amount viewing time of the TV program may then be determined.

20 Claims, 16 Drawing Sheets

(51) Int. Cl.
*H04N 21/258* (2011.01)
*H04N 21/262* (2011.01)
(52) U.S. Cl.
CPC . *H04N 21/25883* (2013.01); *H04N 21/25891* (2013.01); *H04N 21/26241* (2013.01)

(56) References Cited

U.S. PATENT DOCUMENTS

| | | | |
|---|---|---|---|
| 2013/0311408 A1 | 11/2013 | Bagga et al. | |
| 2020/0136889 A1* | 4/2020 | Chen | H04L 41/22 |
| 2021/0174381 A1* | 6/2021 | Cui | H04N 21/6582 |
| 2021/0374132 A1* | 12/2021 | Yang | G06F 16/2457 |
| 2022/0058735 A1* | 2/2022 | Chuzhoy | G06Q 40/04 |

\* cited by examiner

Lead-In Data: From Previous Bucket Samples or Sampled Lead-In Procedure (for Lead-In to First Bucket)

▲ *Four Possible Lead-In State Vectors:* $V_a = [1,1,1]$; $V_b = [1,1,0]$; $V_c = [1,0,0]$; $V_d = [0,0,0]$ Lead-In Data 1202 (Example Lead-In State Vectors)

| Panelists i = 1,...,N \ Samples j = 1,...,M | 1 | 2 | 3 | ... | M |
|---|---|---|---|---|---|
| 1 | $V_b$ | $V_a$ | $V_a$ | ... | $V_d$ |
| 2 | $V_d$ | $V_c$ | $V_a$ | ... | $V_a$ |
| 3 | $V_a$ | $V_a$ | $V_b$ | ... | $V_c$ |
| ... | | | | | |
| N | $V_c$ | $V_a$ | $V_d$ | ... | $V_c$ |

Figure 12

PREDICTIVE MEASUREMENT OF END-USER CONSUMPTION OF SCHEDULED MULTIMEDIA TRANSMISSIONS

CROSS-REFERENCE TO RELATED APPLICATIONS

This application claims priority under 35 U.S.C. § 119(e) to U.S. Provisional Patent Application Ser. No. 63/377,565 filed on Sep. 29, 2022, and to U.S. Provisional Patent Application Ser. No. 63/476,831 filed on Dec. 22, 2022, both of which are hereby incorporated in their entireties herein by reference.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, a system is disclosed. The system may include persistent storage of television (TV) viewing data of a plurality of end-users who have received previous TV program transmissions over one or more content-provider networks, wherein the TV viewing data includes program information for each TV program comprising transmission time and duration, content-provider network, and characterization of the TV program, and wherein the TV viewing data further includes end-user information comprising data characterizing end-users and their previous viewing activities. The system may also include one or more processors, and memory storing instructions that, when executed by the one or more processors, cause the system to carry out various operations. The operations may include: receiving input data comprising an end-user type, a content descriptor of a target TV program, a target content-provider network, and a time descriptor indicating a projected time at which a transmission of the target TV program by the target content-provider network is to begin; identifying a sub-plurality of the end-users according to the end-user type; applying a machine-learning (ML) model to the input data and the TV viewing data to determine, for each respective end-user of the sub-plurality, a respective set of parameters for determining how much of the target TV program that the respective end-user is expected to view during each of a sequence of time intervals starting at the projected time; for each respective end-user of the sub-plurality, using the respective set of parameters to make a viewing determination of (i) temporal-fraction values of the target TV program the respective end-user is expected to view during each of the time intervals, and (ii) for each time interval, conditioning values used to condition the viewing determination for the next time interval; for each respective end-user of the sub-plurality, determining projected subtotals of viewing time of the target TV program, based on the temporal-fraction values determined for all the time intervals; and determining a projected total amount viewing time of the target TV program based on the projected subtotals of all of the end-users of the sub-plurality.

In another aspect, a method is disclosed. The method may be carried out by a computing system having access to persistent storage of television (TV) viewing data of a plurality of end-users who have received previous TV program transmissions over one or more content-provider networks, wherein the TV viewing data includes program information for each TV program comprising transmission time and duration, content-provider network, and characterization of the TV program, and wherein the TV viewing data further includes end-user information comprising data characterizing end-users and their previous viewing activities. The method may include: receiving input data comprising an end-user type, a content descriptor of a target TV program, a target content-provider network, and a time descriptor indicating a projected time at which a transmission of the target TV program by the target content-provider network is to begin; identifying a sub-plurality of the end-users according to the end-user type; applying a machine-learning (ML) model to the input data and the TV viewing data to determine, for each respective end-user of the sub-plurality, a respective set of parameters for determining how much of the target TV program that the respective end-user is expected to view during each of a sequence of time intervals starting at the projected time; for each respective end-user of the sub-plurality, using the respective set of parameters to make a viewing determination of (i) temporal-fraction values of the target TV program the respective end-user is expected to view during each of the time intervals, and (ii) for each time interval, conditioning values used to condition the viewing determination for the next time interval; for each respective end-user of the sub-plurality, determining projected subtotals of viewing time of the target TV program, based on the temporal-fraction values determined for all the time intervals; and determining a projected total amount viewing time of the target TV program based on the projected subtotals of all of the end-users of the sub-plurality.

In still another aspect, a non-transitory computer-readable medium may store instructions thereon that, when carried out by one or more processors of a computing system, cause the computing system to carry out various operations. The computing system may include persistent storage of television (TV) viewing data of a plurality of end-users who have received previous TV program transmissions over one or more content-provider networks, wherein the TV viewing data includes program information for each TV program comprising transmission time and duration, content-provider network, and characterization of the TV program, and wherein the TV viewing data further includes end-user information comprising data characterizing end-users and their previous viewing activities. The operations may include: receiving input data comprising an end-user type, a content descriptor of a target TV program, a target content-provider network, and a time descriptor indicating a projected time at which a transmission of the target TV program by the target content-provider network is to begin; identifying a sub-plurality of the end-users according to the end-user type; applying a machine-learning (ML) model to the input data and the TV viewing data to determine, for each respective end-user of the sub-plurality, a respective set of parameters for determining how much of the target TV program that the respective end-user is expected to view during each of a sequence of time intervals starting at the projected time; for each respective end-user of the sub-plurality, using the respective set of parameters to make a viewing determination of (i) temporal-fraction values of the target TV program the respective end-user is expected to view during each of the time intervals, and (ii) for each time interval, conditioning values used to condition the viewing determination for the next time interval; for each respective end-user of the sub-plurality, determining projected subtotals of viewing time of the target TV program, based on the temporal-fraction values determined for all the time intervals; and determining a projected total amount viewing time of the target TV program based on the projected subtotals of all of the end-users of the sub-plurality.

BRIEF DESCRIPTION OF THE DRAWINGS

FIG. 12 illustrates an example of lead-in data used for conditioning model predictions of ratings, in accordance with example embodiments.

DETAILED DESCRIPTION

I. Overview

Figure 1:
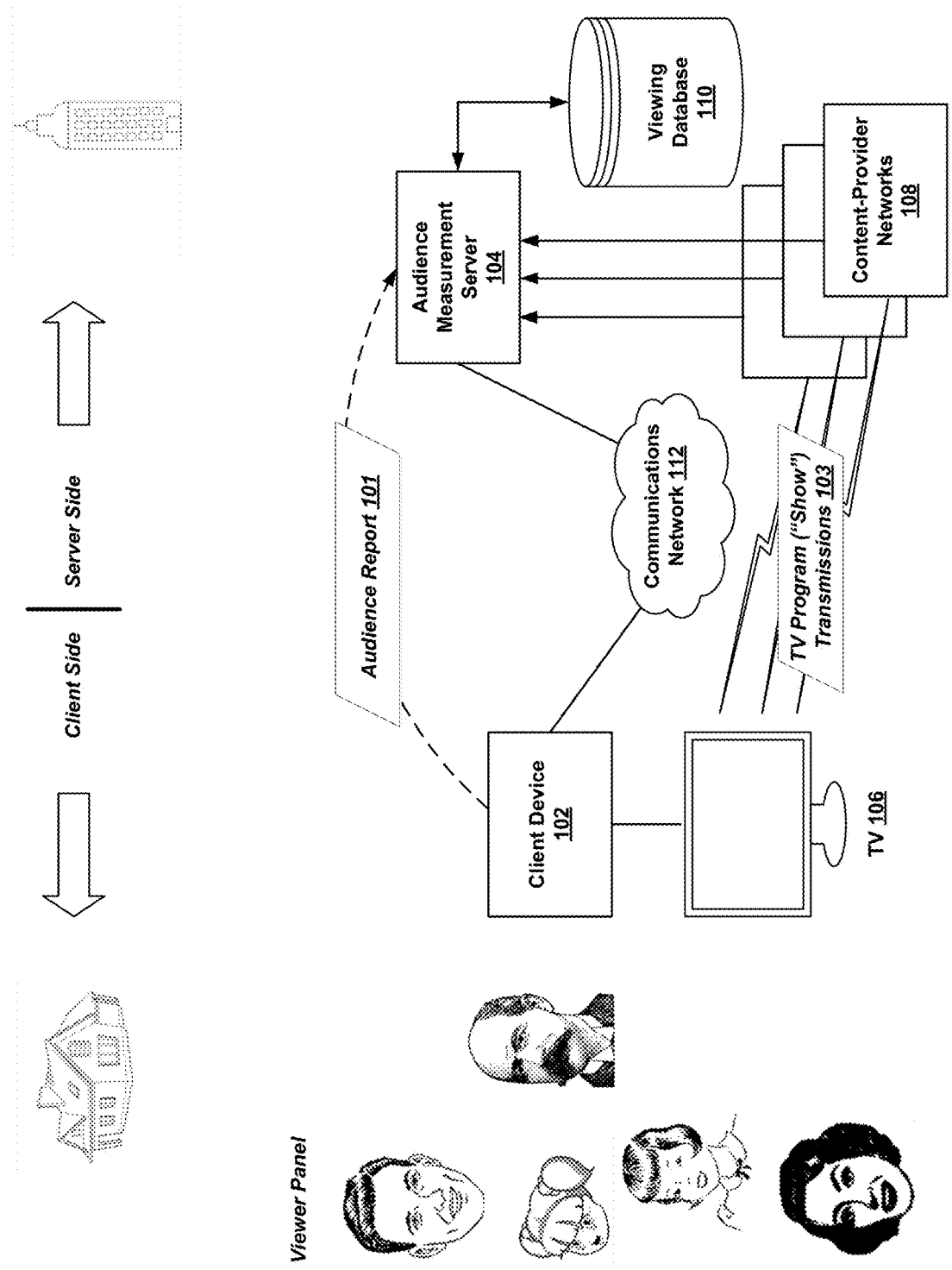
FIG. 1 is a simplified operational block diagram of an example audience measurement system in which various disclosed principles can be implemented.

Content providers may provide various forms of online streaming, broadcast, and/or downloadable media content to end-users, including video media, music and other audio media, and other possible forms of media content, for example. A content provider may be a direct source of content for end-users, or may provide content to one or more content distribution services, such as broadcasters or content-provider networks, which then deliver selected content to end-users. An example of a content provider could be a media content company that provides media content to media distribution services, which then deliver media content to end-users. End-users may subscribe at a cost to one or more media distribution services or directly to one or more media content companies for content delivery, and/or may receive at least some content at no charge, such as from over-the-air broadcasters, (at least partially free) content-provider networks, or from public internet websites that host at least some free content for delivery to end-users. Media content to end-users may be delivered as broadcast or streaming content for immediate playout and/or may be downloaded media files that may be locally stored on user devices for playout at any time, for example.

Content providers and/or media distribution services may be interested in measuring viewing, listening, and/or, other media-consumption statistics of end-users who receive content. For example, content providers and/or media distribution services may want to correlate media TV programming preferences and/or habits of users (e.g., TV viewing choices) with their demographic information, such ages, gender identifications, professions, and educations. As another, non-limiting example, content providers and/or media distribution services may want to collect the same type of information about listeners of radio programs, or consumers of web-based content. Referred to herein as "audience measurement" information or data, such information or data may be useful for marketing, advertising, content-production planning, and/or program scheduling, among other possible uses.

Audience measurement data may include and/or be correlated with information about specific content, such as content-network provider, content type, media type, delivery mode, and when and/or how the content was or will be delivered, among other data. For example, a particular content might be a TV program provided by a TV network (broadcaster) according to a weekly schedule. The TV program could be characterized by a type and/or genre, such as sports, drama, or situation comedy, for example. Other information could describe serialization, episodes, and so on. Analysis of audience data, including content-specific information, may be used to measure performance of specific content among or across various categories of audience demographics, and/or with respect to delivery factors, such as broadcast schedules. One example of a performance metric is ratings.

In practice, audience measurement activities may be conducted by a third party, such as a market research company, and various results and measurements, such as ratings, may be provided as a service to content providers, content distributors, content creators, and/or advertisers, for example. As such, various audience measurement activities may be carried out by a market research company or other entity acting in the service of, or on behalf of, content providers, content distributors, content creators, and/or advertisers. For purposes of the discussion herein, the terms "audience measurement organization" and/or "ratings organization" will be used to refer to such a market research company or other entity. It should be understood there may be a variety of forms of audience measurement or ratings organizations, besides market research companies or third parties, for example, that undertake audience measurement activities. Further, it may be possible for any party interested in, and/or benefiting from, audience measurement activities and/or data, to directly carry out these activities for themselves. These considerations are not limiting with respect to example embodiments described herein.

An audience measurement organization may deploy or implement measurement/ratings system that includes components for collecting both audience measurement data from specific viewers, and content information from content providers and/or media distribution services. For purposes of discussion, and by way of example herein, TV content will be considered. More particularly, example embodiments will be described in terms of TV programs, TV networks, and TV broadcasts. It should be understood, however, that the principles discussed are not limited to the example context, and may be extended and/or adapted to other contexts, such as more general audio and video content and formats, and other types of content providers and/or media distribution services.

Considering the example of TV programming and viewership, audience measurement may involve identifying potential TV viewers who agree to having their viewing habits, choices, and/or preferences monitored and recorded, and then collected as audience viewing statistics. A market research company (or other pertinent entity) may identify potential, willing viewers through a recruiting process, for example. Willing viewers, referred to as "panelists," may agree to provide various demographic information to the content provider and/or media distribution service, and also consent to the placement in their residence of a monitoring device that can monitor and log their TV view activities over time. In particular, the monitoring device may record who among a household of panelists is present during each of some or all "viewing sessions" during which the TV is on (or active), as well as what TV programming (content) is being received by and/or presented on the TV during the viewing sessions. The monitoring device may further be configured to transmit audience viewing statistics in the form of audience viewing reports, for example, the market research company, and/or possibly to the content provider and/or media distribution service. Transmissions may be made via one or another form of communicative connection, such as an internet or other network communication connection, for example. The received audience measurement data may be organized and stored in a viewing database, or other form of persistent storage A measurement/ratings system may also collect content information from one or more content providers and/or media distribution services. Considering again TV programming and viewership, one or more TV networks may provide content information to a measurement/rating system. The measurement/ratings system may then organize and store audience measurement data and content information in the viewing database with the audience measurement data. Various forms of analysis may then be applied to the viewing database to produce ratings and/or other forms of performance metrics, for example.

Conventional analysis of TV viewing data has focused largely on evaluation of past performance. Yet there is also value and benefits in predicting or forecasting expected ratings results for future programming and/or program scheduling. One challenge of predicting future ratings (or other performance metrics), however, is properly accounting for how past TV viewing patterns of individual panelists on both coarse and fine time scales, and in relation to specific programming, influence their future viewing behavior on these same scales and in relation to the same or similar programming. Another challenge is predicting specific cross-sections and/or categories of demographics of panelists that may be considered candidates for particular programming before transmission of the particular programming is actually or hypothetically scheduled to begin.

Accordingly, systems and methods disclosed herein provide techniques for modeling of TV viewing data to predict ratings and/or other performance metrics for future TV programs and transmission schedules. In particular, the inventors have recognized that accounting for past viewing behavior in making predictions of future viewing behavior may be achieved by modeling past behavior in terms of probability distributions, and then recursively calculating future behavior conditioned on past behavior represented in the probability distributions. The inventors have further recognized that TV viewing data for large numbers of panelists who represent a wide range of demographic categories, and whose individual TV viewing activities have been recorded over long periods of time with relatively high time resolution, are particularly well-suited for modeling the sorts of probability distributions upon which predictions may be based. Still further, the inventors have devised an analytical approach to predicting viewing patterns for arbitrary demographics and arbitrary times, in a manner that does not depend potential programming preferences.

The systems, methods, and techniques disclosed herein are described by way of example in terms of audience measurement of TV broadcasts and/or video viewing. However, it should be understood that principles involved may be extended to audience measurement of other forms of end-user consumption of media content and media delivery. Other non-limiting examples may include audience measurement of listening habits and choices of listeners of audio content, such as radio broadcasts, as well as audience measurement of end-user consumption of web-based content and streaming content of audio and video media data.

II. Architecture

FIG. 1 is a simplified operational block diagram of an example audience measurement system in which various disclosed principles can be implemented. As shown, the example audience measurement system 100 includes a client device 102 deployed at client-side site, such as an a residence or domicile of one or more panelists, and an audience measurement server 104 and viewing database 110 deployed at server-side site, such as a managed network and/or cloud computing platform owned and/or operated by or on behalf of the content provider and/or media distribution service. The client device 102 may be considered the monitoring device discussed above, for example. The client device may be communicatively connected to a TV 106, as shown, and may also have a communicative connection with the audience server 104 by way of a communications network 112, such as an internet, for example. In some deployments, another type content presentation device, besides or in addition to, a TV 106 could be used. For example, a PC, desktop computer, or tablet, among other non-limiting examples.

Also as shown, the audience measurement server may be communicatively connected with the viewing database 110. In accordance with example embodiments, the client device 102 may be configured to monitor viewing activities of panelists, and transmit anonymized audience measurement reports 101 to server 104. Various techniques and/or methods for detecting and/or determining which viewer or viewers are present and watching TV may be implemented in the client device 102. Non-limiting examples may include incorporating functionality in a TV remote control device that prompts user self-reporting input, providing a user interface (e.g., a keyboard) for user self-reporting, and a "check-in" device that communicates with the client device 102. Once viewing activity is being monitored, information about panel members present during one or more viewing sessions may be provided in the form of "name IDs" that serve as proxies or aliases for actual panelist identities. These examples of monitoring operations should not be considered as limiting with respect to example embodiments herein.

During audience measurement operations, the client device 102 may be configured to detect when the TV 106 is turned on or made active, and is, or starts, receiving TV programming via one or another form of broadcast stream. Non-limiting examples of a broadcast stream may include over-the-air broadcasts, cable TV broadcasts, and/or network streaming. TV programming may include scheduled broadcasts and/or on-demand streaming, and content may include TV shows (e.g., TV productions, sporting events, etc.) and movies, for example. The client device 102 may also be configured to identify the specific TV programming that is being received and presented at any given time when the TV is on or active. The time during which the TV 106 is on or active and receiving and presenting media content is referred to herein as a "viewing session." There may be one or more viewing sessions over the course of any given time interval, and the client device 102 may thus detect and/or become active during any or all of the one or more viewing sessions. Times during which no TV viewing is occurring may also be considered part of audience measurement, since non-viewing times are reflective of overall viewing activities.

For purposes of discussion, a hypothetical viewer panel of five members is represented by drawings of faces on the left of FIG. 1. By way of example, the panel members are taken to be a hypothetical family of a mother, a father, two girl children, and a grandfather. The specific characterizations of the hypothetical viewer panel members serve to illustrate various aspects of example demographic information, as well as various aspects of example operation. Otherwise, the particular combination of panel members is arbitrary, as are the illustrated faces of the panel members. In accordance with example embodiments, it may be assumed that the panel members have agreed to their membership on the panel, and consented to having their viewing habits and choices reported, possibly in anonymous fashion, to the audience measurement server 104.

In further accordance with example embodiments, alias or proxy identities of the panel members present during a given viewing session may be used. At one or more times after the panel members present at a given viewing session have been determined, the client device 102 may generate an audience report 101 and transmit the report to the audience server via the communications network 112 or other communicative connection. The audience report 101 may include anonymized panel-member identity information, as well as an indication of the TV programming being received during the session.

In some operational scenarios, the client device 102 may aggregate multiple audience reports from multiple viewing sessions, and send the aggregate to the audience measurement server 104 in one transmission or message. The aggregate report of multiple viewing sessions could also be considered a single audience report containing the viewing results of multiple viewing sessions. It should be understood that there can be various ways of aggregating viewing activities from multiple sessions, all of which are non-limiting with respect to example embodiments.

The viewing database 110 may include demographic information associated with each panelist. Non-limiting examples of demographic information may include such demographic categories as age, gender, occupation, income level, ethnicity, and education level. In some examples, a panelist's consent may be obtained separately for each of one or more of the demographic categories to be obtained and recorded. Other forms of privacy safeguards may be implemented as well. Again, forms and/or modes of privacy protection should not be considered as limiting with respect to example embodiments.

As also shown in FIG. 1, one or more content-provider networks 108 may be communicatively connected with the audience measurement server 104. In the example of TV programming, the content-provider networks 108 may be TV broadcast networks, for example, which broadcast TV program transmission 103 that may be received by TV 106. In this disclosure, the colloquial term "TV show" or just "show" is sometimes used to refer to specific TV content transmitted to, and possibly received by, one or more panelists. For the example of TV show broadcasts, a panelist may be considered as receiving a show broadcast or transmitted by a particular TV network if the panelist's TV is set (e.g. "tuned") to the particular TV network during at least part the duration of the transmission, and possibly if the panelist is detected (or logged) as present.

Content-provider networks 108 may also provide the measurement system with information about their TV programming. Such information may include TV program names or other identifiers, data characterizing the TV programs (e.g., type of show, genre, serialization/episodes, associated personalities, such as cast, etc.), broadcast/transmission scheduling (e.g., duration, time of day, day of week, etc.). Other types of information may be included as well. The TV programming information received at the measurement system may be organized and stored in the view database 110 with the audience measurement data. In another arrangement, the TV programming information may be stored in a different database or form of persistent storage. As described below, both the audience measurement data and the TV programming data may be analyzed for making ratings predictions.

While the content-provider networks 108 are depicted in FIG. 1 as being connected to the audience measurement server 104, they may be connected to one or more different elements of the audience measurement system. More generally, the audience measurement system may include additional and/or different components or elements than just the ones shown in FIG. 1.

The ability of the audience measurement system to monitor and collect viewing activities data on a per-panelist basis advantageously yields viewing activity on a fine-grain measurement scale. In consideration of a panelist's consent to provide their viewing activity data, a panelist may also be referred to as "respondents," and viewing data for one or more panelists may be referred to as "respondent-level data." Thus, the viewing database 110 may also be considered a respondent-level database. Each panelist's viewing data may be both measured and collected at time resolutions higher than the typical duration of TV shows transmitted by any given TV network. This allows for measurements and modeling across the durations of shows, as well as during times when particular panelists may be viewing other shows, other networks, or not viewing TV at all. These and other aspects of respondent-level data and modeling-based predictions thereof are described in more detail below.

A. Respondent-Level Data and Prediction System

In accordance with example embodiments, each given panelist may be a consenting subject of TV viewing monitoring and measurement over a respective monitoring timespan, during which the given panelist's viewing activity may be monitored, collected, and recorded continuously over a common sequence of consecutive time intervals. For purposes of discussion, each monitoring/collection interval is also referred to herein as a "time bucket" or just "bucket," and the sequence of time intervals is also referred to as a "sequence of buckets." In at least some example embodiments, each bucket is 15 minutes in duration, with each bucket clock-aligned with respect to an integer hour mark. Each bucket may additionally specify a date (month, day, year) and/or a day of week. Other bucket durations may be used as well, and an integer number of buckets per hour and/or alignment with integer hours may not necessarily be required. However, 15-minute buckets and hour alignment is at least a convenience for analysis and time-referencing of prediction results.

The same (common) sequence of time buckets may be applied to all panelists, though they need not all share the same respective monitoring timespans. Since the recording of viewing activity data of each panelist represents the panelist's viewing history, viewing activity data may also be referred to as historical viewing activity. Also, a given panelist's respective monitoring timespan, or any portion thereof that may be studied or analyzed, may be referred to the panelist's respective "historical viewing timeline."

In further accordance with example embodiments, monitoring of each panelist's viewing activity in (or during) each bucket may be carried out on a fine enough timescale (resolution) to measure a percentage or fraction of the bucket interval during which the panelist watches any TV, any particular TV network, and/or any particular TV show. A non-limiting example of measurement timescale is once per minute, corresponding to 15 measurements per bucket for 15-minute buckets. On this timescale, percentages of bucket duration may be measured in increments of roughly 6.7% (or fractional steps of 0.067). It should be understood that other measurement timescales may be used.

Continuing with the example of 15-minute, hour-aligned buckets, there are 96 buckets per day, 672 buckets per week, and 35,040 buckets per year (or 35,136 per leap-year). In practice, a typical panelist may spend a relatively small fraction of each day and/or week watching TV. Accordingly, for practical purposes, any particular time span during which a given panelist does not watch any TV may be recorded in the viewing activity measurement data as simply a starting bucket time and a "no-TV" integer specifying the number of consecutive whole buckets in the particular time span.

For the example of broadcast TV, 15-minute buckets and hour alignment may conveniently align with typical TV broadcasting schedules. More particularly, TV networks may schedule transmissions and/or broadcasting of TV shows according to 15-minute "time slots" or just "slots." As with buckets, each time slot is 15 minutes in duration and clock-aligned with respect to an integer hour mark. As such, each time slot may be considered as specifying a time of day. In addition, as a scheduling descriptor, each time slot may also specify a day of week, a month, and a year. In the context of scheduling, a particular time slot may refer to a one-time show broadcast (e.g., a particular sporting event), or a serialized TV show with weekly (or other periodic) episodes or quasi-periodic installments (e.g., annual finals of a sports tournament), among other possibilities. However, time slots may also be just considered as a continuous sequence of time intervals. If the intended usage herein is not evident from context, it will be stated explicitly. For example, "the Sunday 8:00 pm time slot" may be understood from context as referring to a schedule of periodically (weekly) repeating time slots.

To the extent that each bucket in any given panelist's record historical viewing activities aligns with some time slot, buckets may also be considered in relation to time-slot scheduling. Thus, for example, over a time span of 20 weeks, there will be 20 buckets that align with the "the Sunday 8:00 pm time slot." For a given panelist, the individual viewing activity data recorded in each of those 20 buckets will be largely distinct, but may also be collectively analyzed for modeling the given panelist's viewing behavior in "the Sunday 8:00 pm time slot," for example. In the latter context, a multiplicity of buckets all aligned with a particular time slot refers to a sequence of buckets that repeat with the same pattern as the particular time slot. The most typical pattern may be periodic, as in the example weekly repetition. However, other patterns are possible as well, such as "Game 3 of the World Series" over a multi-year time span.

In the discussion below of modeling and prediction, the term "bucket" may be used interchangeably with "time slot" when referring to a particular scheduling pattern. For example, "modeling data in the Sunday 8:00 pm bucket" may be taken to mean modeling the collective data of some or all buckets that align with "the Sunday 8:00 pm time slot." The term "historical bucket" will generally be used to refer to the dates and times assigned to one or more buckets of recorded historical viewing activities. Thus, for example, data recorded in historical buckets aligned with "the Sunday 8:00 pm bucket" may be analyzed collectively to model the "the Sunday 8:00 pm bucket."

Figure 2:
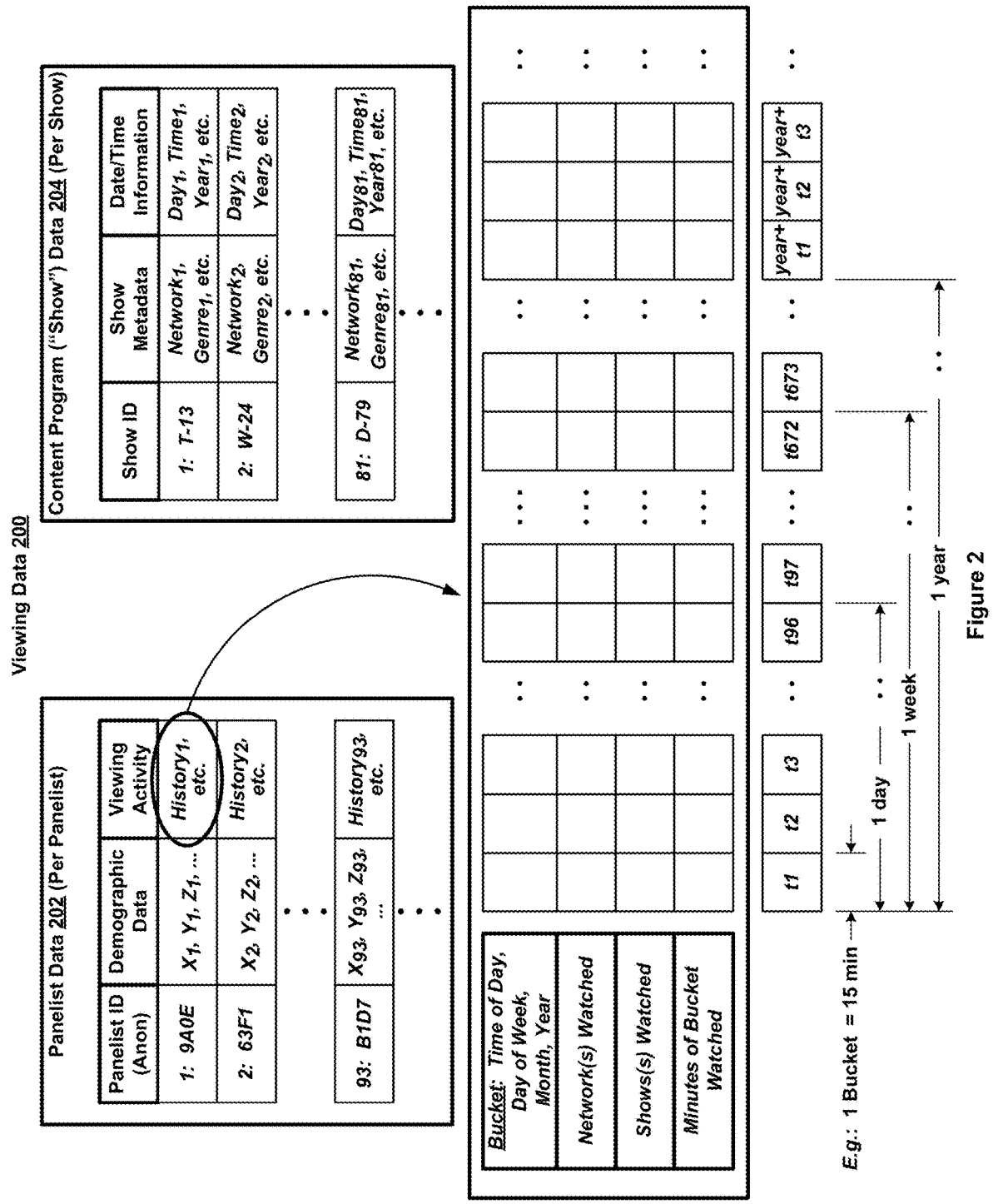
FIG. 2 illustrates an example of viewing data that may be collected, at least in part, by an audience measurement system, in accordance with example embodiments.

FIG. 2 illustrates an example data structure of viewing data 200 that may be recorded in the viewing database 110, in accordance with example embodiments. As shown the viewing data 200 may include panelist data 202, and content (TV show) data 204. In accordance with example embodiments, the panelist data 202 may include a record or other data structure for each panelist. By way of example, each panelist record may include an anonymized panelist identification (ID), demographic data, and historical viewing activity measurements. In further accordance with example embodiments, the content data 204 may include a record or other data structure for each of a collection of TV shows. Also by way of example, each TV show record may include a show ID, show metadata, and date/time scheduling information.

In the example illustrated in FIG. 2, panelists and their associated records are numbered (indexed) 1, 2, . . . , etc., where vertical ellipses represent additional panelist records. The panelist IDs are represented by way of example as arbitrary hexadecimal numbers, and demographic data are represented as "$X_i$, $Y_i$, $Z_i$, . . . ," where i is the index of the panelist, and X, Y, Z, etc., may signify various (with the panelist's consent) demographic categories, such as age, gender, occupation, education level, salary, and/or ethnicity, among others. Demographic information may also include, to the extent applicable, and with the panelist's consent, domicile information, such as geographic region, owner/renter, housing type, number/relation of occupants, and/or household income. Additional and/or different demographic categories are possible as well, and none of the categories is limiting with respect to example embodiments herein.

The historical viewing activity of the panelists in the panelist data 202 is designated as "$History_i$, etc.," where i is again the index of the panelist. In accordance with example embodiments, the recorded historical viewing activity for each panelist may take the form of a table or similar data structure. An example of such table is shown in FIG. 2 for panelist #1. The example table is organized as four rows each having a sequence of columns, where each column corresponds to one of a sequence of consecutive buckets. Horizontal ellipses represent additional columns that are not explicitly depicted in the figure. As shown, the four rows are bucket time (time of day, day of week, month, and/or year), TV network(s) watched, TV show(s) watched, and minutes of bucket watched. Each table entry thus records the associated row information applicable to the associated column (bucket of the sequence). For the sake of visual clarity in the figure, the illustrated table entries are depicted as empty; this should not necessarily be interpreted as missing or omitted data.

A timeline of buckets aligned with the table columns is shown beneath the table for reference, and to reiterate the relation of bucket size and sequence to day, week, and year. Namely, 96 buckets per day, 672 buckets per week, and 35,040 buckets per year (or 35,136 per leap-year). As noted above, any particular time span during which a given panelist does not watch any TV may be recorded in the viewing activity measurement data as simply a starting bucket time and a "no-TV" integer specifying the number of consecutive whole buckets in the particular time span. Accordingly, the size and storage requirements of the table for any given panelist may be smaller than that corresponding to the panelist's historical viewing timeline.

In the example content data 204 illustrated in FIG. 2, TV shows and the associated records are numbered (indexed) 1, 2, . . . , etc., where vertical ellipses represent additional panelist records. The show IDs are represented with arbitrary designations for purposes of illustration. Show metadata are shown to include, by way of example, "$Network_i$, $Genre_i$, etc.," and date/time (scheduling) information include "$Day_i$, $Time_i$, $Year_i$, etc.," where i is the index of the TV show. The network may identify which TV network transmitted and/or broadcast the TV show, and the date/time information for a given show could correspond to a scheduling time slot for the show on or by the identified network. The genre of the show may represent various characteristics of the show that may be applied in modeling to identify similar shows and/or to serve as an indicator of characteristics of a hypothetical or planned show that is the subject of model-based predictions. In this context, the term "genre" may be taken as broadly characterizing a show—e.g., as sporting event, drama series or movie, comedy series or movie, and/or being associated with one or more particular personalities (e.g., actors, directors, etc.). As described below, some or all of the categories of content program data 204 may serve as input to modeling and predictions, both during model training and inference operations.

It should be appreciated that the particular arrangement of the viewing data 200, the panelist data 202, and the program data 204 has been described above by way of example, and that other arrangements may be devised and/or used. For example, the historical viewing activity data table could include different and/or additional rows. As another example, show metadata could include time/date information instead of it being recorded as separate categories. These are just two examples of how the viewing data 200 could possibly differ from that described above. In any case, the examples above should not be considered as limiting with respect to possible alternatives and/or with respect to applicability to example embodiments.

In accordance with example embodiments, respondent-level data (RLD), such as that illustrated in FIG. 2, may be analyzed to derive models of historical viewing patterns of panelists, which may then be used for predicting or forecasting future ratings or other performance metrics of new or proposed TV shows, and/or of alternative scheduling of existing TV shows. More generally, the analytical principles described below by way of example in the context of TV program transmissions and broadcasting may be adapted for application to any monitored consumption by end-users of multimedia program content delivered by one or more content-provider networks according to scheduled transmissions. RLD-based prediction may be illustrated by an example usage scenario applied in the context of TV program broadcasting by one or more TV networks.

According to one such example usage scenario, a TV network executive, producer, or other person may be interested or responsible for forecasting ratings of a new or planned TV show during one or more possible scheduling time slots. The new or planned program may be characterized (or characterizable) according to similarities to one or more existing TV programs represented in a respondent-level database. Further, the executive or producer may want to evaluate predicted ratings for a variety combinations of demographic categories, hypothetical audience sizes, and/or hypothetical scheduling time slots. In accordance with example embodiments, an RLD-based model predictor system may take various selection criteria or parameters as input, and apply an analytical model to respondent-level data, such as viewing data 200, and, generate predictions of ratings, subject to the input criteria. By invoking the analytical model for a variety of input criteria, a corresponding variety of predicted ratings may be generated.

The inventors have determined that respondent-level data, such as that illustrated in FIG. 2, may be particularly well-suited for both making machine-learning (ML) model inferences of probabilistic characterizations of panelists' viewing behavior, and then applying the probabilistic characterizations to predict panelists' expected viewing activities under a variety of assumed input criteria and/or conditions. More specifically, the inventors have recognized that any given panelist's viewing activity during a particular periodic (or quasi-periodic) time slot may be modeled probabilistically, based partly on the given panelist's historical viewing activity in all or some of the historical buckets aligned with the same particular periodic time slot across the given panelist's historical viewing timeline.

The inventors have further recognized that the given panelist's viewing activity during any historical bucket may be partially dependent on the given panelist's viewing activity in the immediately-preceding historical bucket. In particular, the given panelist's viewing activity during the time slot immediately preceding the particular periodic time slot may be similarly probabilistically modeled, and the results may be applied as conditions to the modeling results derived in the particular periodic time slot that follows. Thus, the given panelist's modeled viewing activity in a sequence of time slots may be recursively connected from one time slot to the next in the sequence.

In accordance with example embodiments, the recursive connection between modeled viewing activity in successive time slots may be computationally implemented by casting viewing activity in terms of respective probability distributions in each of the successive time slots, and then generating multiple simulated samples from the probability distributions. The simulated samples may then be used both to compute, for each time slot, a ratings factor for a particular TV show, and to condition the computation of samples in the next time slot. The probability distributions applied in each time slot may be specified by parameters that are determined from a ML model applied to the RLD.

In accordance with example embodiments, the ML model may be trained using a training subset of the RLD in such a manner that the probability distribution parameters generated during "inference" operation of the trained ML model are specific to the input criteria. As noted, the criteria may include a characterization of a new or planned TV show, a target TV network, a planned time slot for transmission or broadcast, and one or more demographic categories. Thus, the probabilistic modeling and simulated sampling may be "tuned" according to the input criteria.

In addition to the input criteria mentioned, an input parameter referred to as "network reach" may also be specified. Network reach may be used to further characterize an expected or hypothesized initial audience for the ratings predictions. Now substituting (as mentioned above) the term "bucket" for "time slot" in reference to modeling, network reach may specify a fraction or percentage of all panelists meeting the demographic categories criteria that are expected or hypothesized to be watching the target TV network at the start of the bucket aligned with the input planned time slot. One purpose of specifying network reach is to determine initial conditioning input variables for the first bucket of the modeling procedure, since this first bucket otherwise lacks recursive input. Thus, the inventors have further devised analytic techniques for predicting initial conditioning for the first bucket of the recursive modeling procedure, based on the network reach supplied with the input and applied to the RLD.

More specifically, for a given panelist, the conditioning inputs for each given bucket of the recursive modeling procedure may be specified as Boolean variables corresponding to predictions of whether or not, during the immediately preceding bucket, the given panelist: (i) watched any TV, (ii) watched the target TV network, and/or (iii) watched the new or planned TV show. These Boolean variables may be referred to as "lead-in variables," signifying that they lead into the next bucket, and their combination in any given instance may be referred to as a "lead-in scenario."

For each bucket following the first, the lead-in variables may be determined from the modeling results in the previous bucket. For the first bucket, however, there are no modeling results from the preceding bucket. Instead, and in accordance with example embodiments, historical viewing activity data in historical buckets may be analyzed, subject to the input criteria and network reach, to determine lead-in variables for the first bucket. The lead-in variables for the first bucket may be referred to herein as "sampled lead-in variables" or just "sampled lead-ins," signifying the analytical procedure used to determine them. The sampled lead in procedure is described in detail below. Note that since the new or planned TV show will not have started in the bucket preceding the first bucket, the sampled lead-in variable for whether or not the given panelist watched the TV network may serve in place of whether or not the given panelist watched the new or planned TV show.

Figure 3:
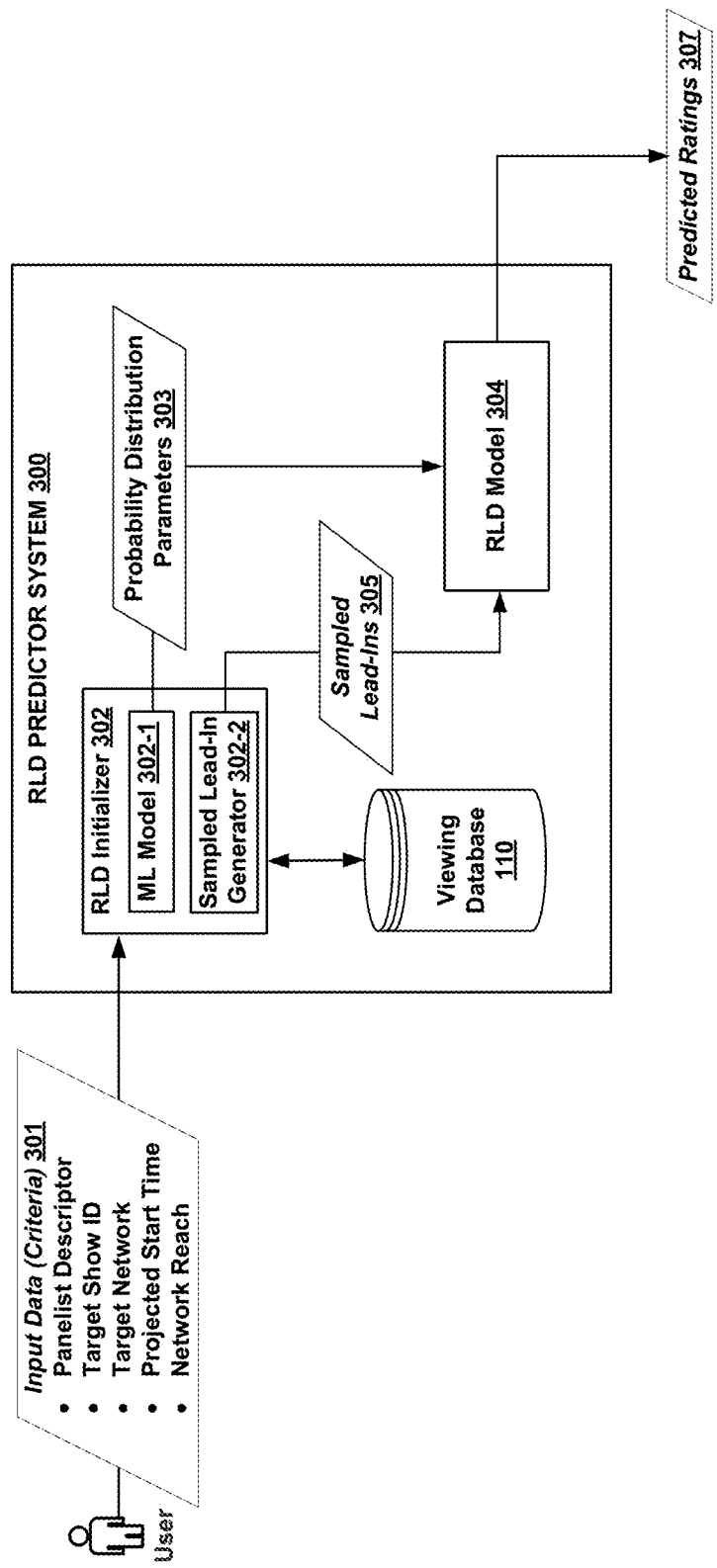
FIG. 3 is a simplified block diagram of an example respondent-level data predictor system for predicting ratings, in accordance with example embodiments.

FIG. 3 is a simplified block diagram of an example respondent-level data (RLD) predictor system 300 for predicting ratings, in accordance with example embodiments. As shown, the RLD predictor system includes a RLD initializer 302, a RLD model 304, and the viewing database 110. The RLD initializer 302 includes a ML model 302-1 and a sampled lead-in generator 302-2.

As shown, a user (not to be confused with a panelist or an "end-user" who consumes multimedia data and may serve as a panelist) provides input criteria 301 to the RLD initializer 302. In this example, the input criteria 301 may include a panelist descriptor, a target show ID, a target network, a projected (planned) start time, and a network reach, also sometimes referred to as "target network reach." The panelist descriptor may specify one or more demographic categories. The target show ID may identify an existing TV show having characteristics considered similar to those of a planned or new TV show. As such the target show may be used for modeling audience response for the new or planned TV show based on historical viewing of the target show. The planned network and start time of the new or planned show may be specified by the target network and projected start time. The network reach is as described above. In some examples, the target show ID may point to an existing show that has never been broadcast or aired, and thus still "new" or "planned" in the sense described above. In this case, the characteristics of the target show may be considered as directly associated with the new or planned show.

The input criteria 301 may be received by the RLD initializer 302. The ML model 302-1 may apply a trained ML model to the input criteria to determine (infer) probability distribution parameters 303 for the recursive modeling of the RLD model 304. The sampled lead-in generator 302-2 may analyze the input criteria (with the possible exception of the target show ID), including the network reach, to determine the sampled lead-ins 305. The viewing database 110 may be accessed as necessary to retrieve historical view activities, for example.

The RLD model 304 may receive the probability distribution parameters 303 and the sample lead-ins 305 and may apply both inputs to the recursive probability distribution modeling, to determine the predicted ratings 307. Details of various aspects of the analysis and processing just outlined are discussed below. In accordance with example embodiments, the various components and operations of the RLD predictor system 300 may be implemented and/or carried out by one or more computing systems, examples of which are described next. A detailed discussion of analytical principles and example operation of an RLD predictor system then follows.

B. Example Computing System and Cloud-Based Computing Environments

Figure 4:
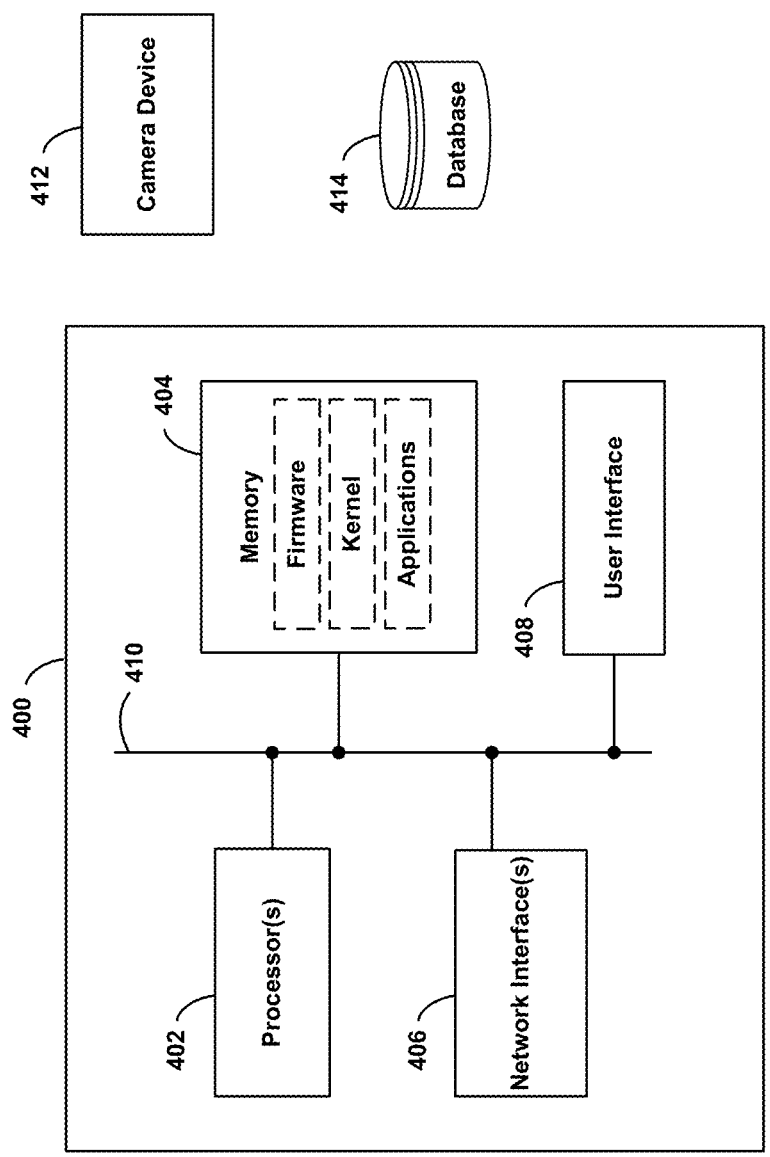
FIG. 4 illustrates a schematic drawing of a computing device, in accordance with example embodiments.

FIG. 4 is a simplified block diagram of an example computing system (or computing device) 400. The computing system 400 can be configured to perform and/or can perform one or more acts, such as the acts described in this disclosure. As shown, the computing device 400 may include processor(s) 402, memory 404, network interface(s) 406, and an input/output unit 408. By way of example, the components are communicatively connected by a bus 410. The bus could also provide power from a power supply (not shown).

Processors 402 may include one or more general purpose processors and/or one or more special purpose processors (e.g., digital signal processors (DSPs) or graphics processing units (GPUs). Processors 402 may be configured to execute computer-readable instructions that are contained in memory 404 and/or other instructions as described herein.

Memory 404 may include firmware, a kernel, and applications, among other forms and functions of memory. As described, the memory 404 may store machine-language instructions, such as programming code or non-transitory computer-readable storage media, which may be executed by the processor 402 in order to carry out operations that implement the methods, scenarios, and techniques as described herein. In some examples, memory 404 may be implemented using a single physical device (e.g., one magnetic or disc storage unit), while in other examples, memory 404 may be implemented using two or more physical devices. In some examples, memory 404 may include storage for one or more machine learning systems and/or one or more machine learning models as described herein.

In some instances, the computing system 400 can execute program instructions in response to receiving an input, such as an input received via the communication interface 406 and/or the user interface 408. The data storage unit 404 can also store other data, such as any of the data described in this disclosure.

The communication interface 406 can allow the computing system 400 to connect with and/or communicate with another entity according to one or more protocols. In one example, the communication interface 406 can be a wired interface, such as an Ethernet interface. In another example, the communication interface 406 can be a wireless interface, such as a cellular or WI-FI interface.

The user interface 408 can allow for interaction between the computing system 200 and a user of the computing system 400, if applicable. As such, the user interface 408 can include, or provide an interface connection to, input components such as a keyboard, a mouse, a touch-sensitive panel, and/or a microphone, and/or output components such as a display device (which, for example, can be combined with a touch-sensitive panel), and/or a sound speaker.

The computing system 400 can also include one or more connection mechanisms that connect various components within the computing system 400. For example, the computing system 400 can include a connection mechanism 410 that connects components of the computing system 400, as shown in FIG. 4.

Network interface(s) 406 may provide network connectivity to the computing system 400, such as to the internet or other public and/or private networks. Networks may be used to connect the computing system 400 with one or more other computing devices, such as servers or other computing systems. In an example embodiment, multiple computing systems could be communicatively connected, and example methods could be implemented in a distributed fashion.

Although not explicitly shown, the computing system 400 may also include one or more device controllers and/or interfaces for connecting to integrated and/or peripheral devices. By way of example, a camera device 412 is shown as a representative peripheral device and/or as an integrated device. Additional and/or other types of peripheral devices or components are possible as well.

In example embodiments the computing system 400 may be or include a client device, such as client device 102 discussed above. Such a client device may include an interactive display, such as a GUI. In addition to the operations discussed above and detailed below, a client device may generally be used for user access to programs, applications, and data of the computing device 400. For example, a GUI could be used for graphical interaction with programs and applications described herein.

Database 414 may include storage for input and/or output data, such as demographic information. Thus, viewing database 110 may be an example of the database 414.

In some configurations, the computing system 400 can include one or more of the above-described components and can be arranged in various ways. For example, the computer system 400 can be configured as a server, such as the audience measurement server 104, and/or a client (or perhaps a cluster of servers and/or a cluster of clients) operating in one or more server-client type arrangements, for instance.

Figure 5:
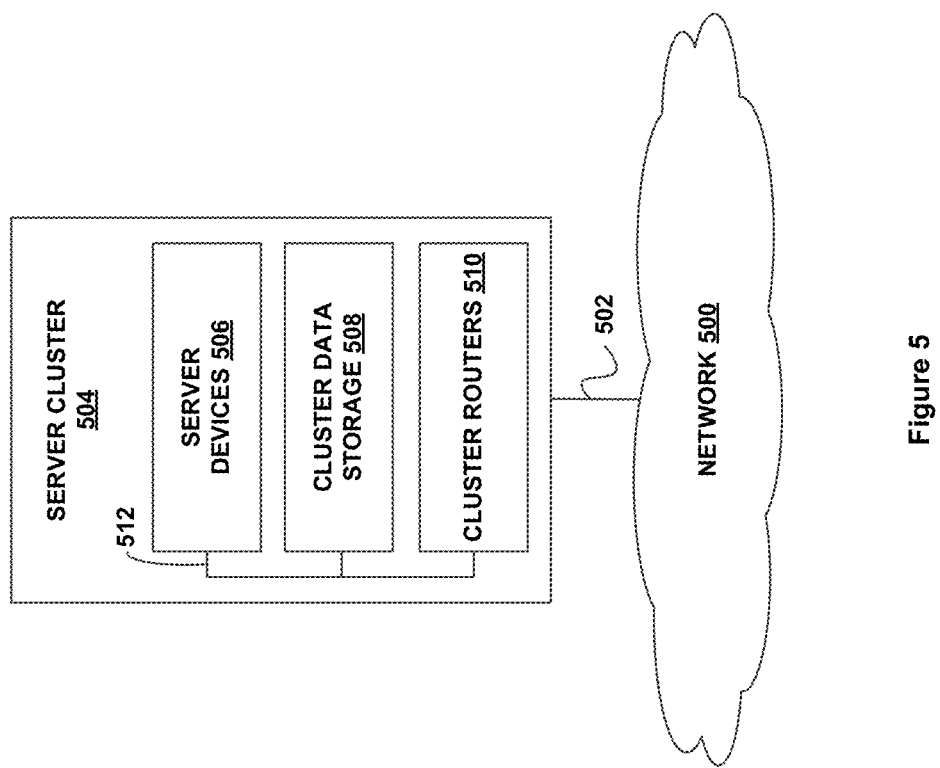
FIG. 5 illustrates a schematic drawing of a server device cluster, in accordance with example embodiments.

FIG. 5 depicts a cloud-based server cluster 500 in accordance with example embodiments. In FIG. 5, operations of a computing device (e.g., computing device 400) may be distributed between server devices 502, data storage 504, and routers 506, all of which may be connected by local cluster network 508. The number of server devices 502, data storages 504, and routers 506 in server cluster 500 may depend on the computing task(s) and/or applications assigned to server cluster 500.

For example, server devices 502 can be configured to perform various computing tasks of computing device 400. Thus, computing tasks can be distributed among one or more of server devices 502. To the extent that these computing tasks can be performed in parallel, such a distribution of tasks may reduce the total time to complete these tasks and return a result. For purposes of simplicity, both server cluster 500 and individual server devices 502 may be referred to as a "server device." This nomenclature should be understood to imply that one or more distinct server devices, data storage devices, and cluster routers may be involved in server device operations.

Data storage 504 may be data storage arrays that include array controllers configured to manage read and write access to groups of hard disk drives and/or solid state drives. The drive array controllers, alone or in conjunction with server devices 502, may also be configured to manage backup or redundant copies of the data stored in data storage 504 to protect against drive failures or other types of failures that prevent one or more of server devices 502 from accessing units of data storage 204. Other types of memory aside from drives may be used.

Routers 506 may include networking equipment configured to provide internal and external communications for server cluster 500. For example, routers 506 may include one or more packet-switching and/or routing devices (including switches and/or gateways) configured to provide (i) network communications between server devices 502 and data storage 504 via local cluster network 508, and/or (ii) network communications between server cluster 500 and other devices via communication link 510 to network 512.

Additionally, the configuration of routers 506 can be based at least in part on the data communication requirements of server devices 502 and data storage 504, the latency and throughput of the local cluster network 508, the latency, throughput, and cost of communication link 510, and/or other factors that may contribute to the cost, speed, fault-tolerance, resiliency, efficiency, and/or other design goals of the system architecture.

As a possible example, data storage 504 may include any form of database, such as a structured query language (SQL) database. Various types of data structures may store the information in such a database, including but not limited to tables, arrays, lists, trees, and tuples. Furthermore, any databases in data storage 504 may be monolithic or distributed across multiple physical devices.

Server devices 502 may be configured to transmit data to and receive data from data storage 504. This transmission and retrieval may take the form of SQL queries or other types of database queries, and the output of such queries, respectively. Additional text, images, video, and/or audio may be included as well. Furthermore, server devices 502 may organize the received data into web page or web application representations. Such a representation may take the form of a markup language, such as the hypertext markup language (HTML), the extensible markup language (XML), or some other standardized or proprietary format. Moreover, server devices 502 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Analytic Principles and Example Operations

A. Probabilistic Framework

As outlined briefly above, an example RDL predictor system may be configured to forecast ratings or other performance metrics of new or planned TV shows by modeling each of a particular set of panelists' viewing activities during a sequence of consecutive buckets, in terms of probability distributions in each bucket. A multiplicity of simulated samples drawn from the probability distributions in each bucket may be applied as conditions to computations within buckets, and in recursion relations across successive buckets. The parameters of the probability distributions may initially be determined by a ML-based model trained on a training subset of historical viewing activities of panelists. The particular set of panelists may be determined according to the input criteria, as may be the new or planned TV show, its planned transmission or broadcast time slot, planned network, and network reach. The sequence of buckets in which the modeling is carried out corresponds to the duration of the planned or new TV show, beginning at the planned time slot. There may be other input criteria as well.

The probability modeling for each panelist in each bucket of a sequence may be understood in more detail as follows. Ratings of a particular TV show among all panelists of a designated combination of demographic categories may be expressed as a function of the total amount of time—e.g., total minutes—that those panelists watched the particular TV show. In particular, the ratings are related to a sum of respective weighted averages of each panelist's viewing time, where the weightings may be specific for each panelist. Thus, the number of minutes of the particular TV show (out of the total duration of the show) that each panelist watches may be considered an operative quantity in calculating ratings. This applies to both historical ratings for previously broadcast TV shows, and predicted ratings as determined by modeling described herein.

For historical ratings, the total minutes of a show watched by a given panelist may be determined by tallying the minutes watched by the given panelist as recorded for each historical bucket during the TV show broadcast. Referring again to FIG. 2, this may correspond to the "minutes of bucket watched" value in historical buckets during the TV show broadcast as recorded in the illustrated viewing history, for example. For probability modeling, the predicted total minutes watched by a given panelist may be determined as a tally of predicted minutes watched in each bucket of a planned or new TV show.

In accordance with example embodiments, the predicted minutes watched in a given bucket by the given panelist may be determined as a conditional probability of a number of minutes watched in the given bucket. More particularly, three conditions may be applied to an unconditional probabilistic determination of minutes watched in order to predict the number of minutes watched in a given bucket: (i) whether or not the given panelist watched any TV during the given bucket; (ii) whether or not the given panelist watched the planned TV show during the given bucket; and/or (iii) whether or not the given panelist watched the entire amount of the planned TV show within the given bucket. Note that in the context of forecast modeling, the phrase "watched the show" or the like should be considered in a probabilistic sense.

The three conditions may each be represented by Boolean variables, such as "0/1" or "No/Yes. In terms of probabilities, a random process of "success" or "failure" (i.e., Boolean variables) may be represented by a Bernoulli distribution with parameter p, where p is the probability of success. Analytically, a Bernoulli distribution may be expressed as:

$$f(x) = \begin{cases} p^x(1-p)^{1-x} & \text{for } x \in \{0, 1\} \\ 0 & \text{otherwise} \end{cases} \quad (1)$$

For example, a random drawing of M=1,000 samples from a Bernoulli distribution with parameter p=0.6, would be expected to yield 600 successes and 400 failures. In practice, the actual observed numbers of successes and failures for any given M-sample drawing from a Bernoulli distribution may deviate from the exact number predicted by p, but as M tends to infinity, the deviation may be expected to tend towards zero.

In accordance with example embodiments, each of the three Boolean conditions may be modeled probabilistically by a different Bernoulli distribution, each having its own parameter p. As described below, a trained ML-based model may be used to infer the three p-values for any given panelist during each of any sequence of buckets, and subject to specified input criteria, based on the given panelist's historical viewing activity. As also described below, each of the three p-values for any given bucket may be further determined as multi-valued, with dependence on lead-in conditions for the bucket. This aspect may be introduced as a recursion relation between the modeling computations in successive buckets.

The unconditional probabilistic prediction of the number of minutes watched in a given bucket may be calculated as a probabilistic prediction of the fraction or percentage of the bucket watched multiplied by the bucket size (duration). For example, a predicted fraction of 0.7 of a 15-minute bucket corresponds to 10.5 predicted minutes watched. In terms of probabilities, a random process of occurrences of "success" or "failure" for which the outcomes are already known may be represented by a Beta distribution with parameters α and β. Analytically, a Beta distribution may be expressed as:

$$f(x; \alpha, \beta) = \frac{1}{B(\alpha, \beta)} x^{\alpha-1} (1-x)^{\beta-1}, \quad (2)$$

where α and β determine the shape of the distribution, and can be thought of as, respectively, the number of successful and unsuccessful events in the observed (known) outcomes. The denominator $B(\alpha,\beta)$ is a normalizing factor obtained by integrating the numerator from zero to one. The Beta distribution returns a number between zero and one, and in accordance with example embodiments, may therefore be used to represent a predicted fraction of a bucket for a and/that have been determined from historical viewing activities.

More specifically, in addition to p for each of the Bernoulli distributions, the trained ML-based model may also infer α and β for any given panelist during each of any sequence of buckets, and subject to specified input criteria, based on the given panelist's historical viewing activity. Referring again to FIG. 2, the "minutes of bucket watched"

value in the given panelist's viewing history may be converted to observed fractional (or percentage) values of bucket watched for each bucket in the given panelist's historical timeline. These observed fractional values may be considered "true" outcomes of Beta distributions, and applied in loss functions for training the ML-based model over a training subset of the data. The trained model may then be used to infer α and β for any later specified input criteria.

As described below, the ML-based model may be trained to infer instead two different parameters, μ and K, from which α and β may be easily derived. Also, as with the three p-values, each of μ and K may be further determined as multi-valued, again with dependence on lead-in conditions for the bucket as applied in the recursion relation between the modeling computations in successive buckets.

Figure 6:
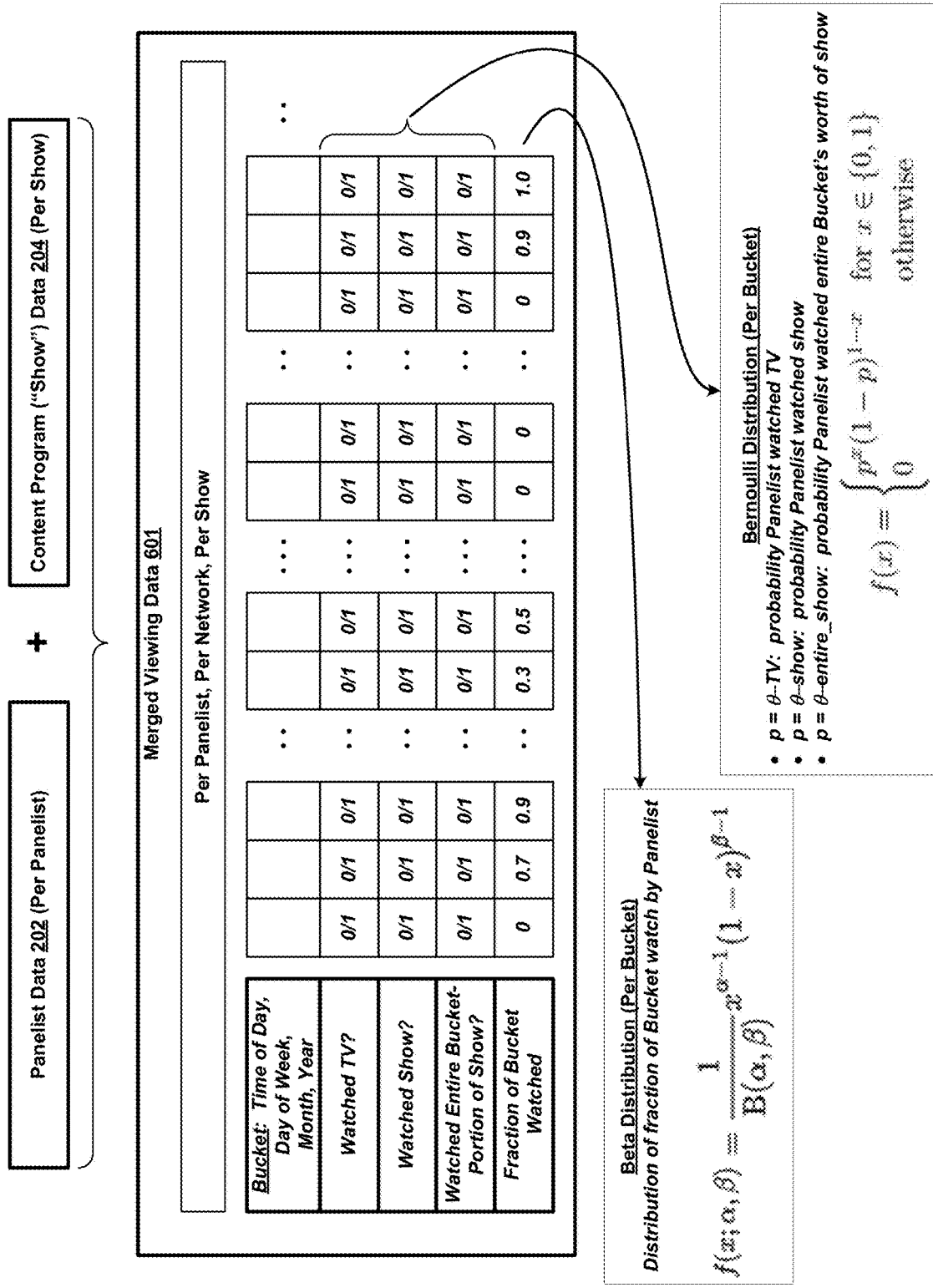
FIG. 6 illustrates an example of merged viewing data for modeling probability distributions applied in ratings predictions, in accordance with example embodiments.

FIG. 6 is a conceptual illustration of an example of merged viewing data 601 for modeling probability distributions applied in ratings predictions, in accordance with example embodiments. In particular, merged viewing data 601 may be thought of as merging panelist data 202 on a per panelist basis, and content program data 202 on a per show basis to yield at least five categories of viewing history data for each given panelist and each given show. As shown in FIG. 6, the merged viewing data 601 may be represented as a table, where each row is one of the at least five categories and each column is a historical bucket.

In example embodiments, the at least five categories may be: (1) bucket (e.g., time of day, day of week, month, year, etc.); (2) a Boolean variable labeled "Watched TV?" indicating whether or not the panelist watched TV during the associated bucket; (3) a Boolean variable labeled "Watched Show?" indicating whether or not the panelist watched the TV show during the associated bucket; and (4) a Boolean variable labeled "Watched Entire Bucket-Portion of Show?" indicating whether or not the panelist watched the entirety of the portion of TV show presented (e.g., broadcast) during the associated bucket; and (5) a fractional variable labeled "Fraction of Bucket Watched" indicating what fraction of the TV show broadcast during the bucket that the panelist watched.

For purposes of illustration, the Boolean variable in each of the buckets is represented as "0/1," and, by way of example, arbitrary fractions are shown for the fractional values in each bucket. Note that for any bucket in which "Watched TV?" is false (zero), all of the other variables in that bucket will necessarily be zero as well. As noted above, any sequence of consecutive buckets for which this is the case may be represented by an indicator of the first of such "empty" bucket followed by an integer number indicating the number of empty buckets in the sequence.

There may be other viewing data recorded for each bucket beside that shown in FIG. 6. For example, there may be a Boolean variable in each bucket indicating whether or not the panelist watched the TV network that broadcast the TV show. As described above and discussed below in more detail, this variable is one of the lead-in conditions of the recursion relation between buckets. Additionally, it should be understood that the structural representation of merged viewing data 601 depicted in FIG. 6 serves the discussion herein, and should not be viewed as limiting with respect to other structural forms that may be used in actual implementations.

As described above, and indicated in the box at the bottom right in FIG. 6, the three Boolean variables recorded in each bucket may be used to determine the three Bernoulli distributions, according to respective values of the parameter p. More particularly, the parameter p for the three Bernoulli distributions may be defined according to:

p=θ-TV for the probability that given panelist watch TV during the given bucket;

p=θ-show for the probability that given panelist watch the show during the given bucket;

p=θ-entire_show for the probability that given panelist watch the entire bucket's worth of the show during the given bucket;

Likewise, the variables recorded for "Fraction of Bucket Watched" may be used to determine the Beta distribution, according to the parameters μ and K, from which α and β may be derived. This is indicated in the box at the bottom left in FIG. 6.

Figure 7:
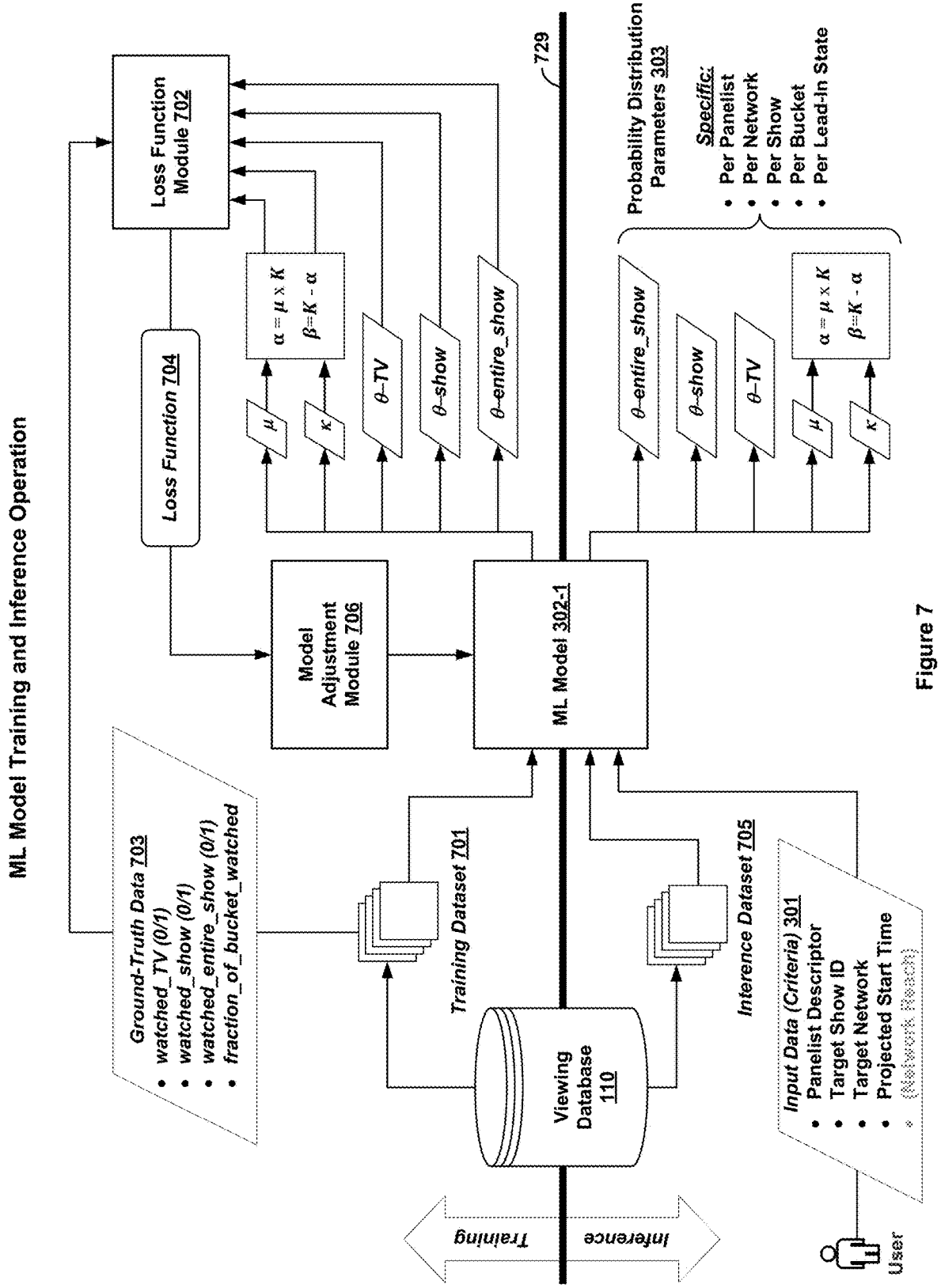
FIG. 7 illustrates example training operation and inference operation of a machine learning model for determining probability distribution parameters, in accordance with example embodiments.

FIG. 7 illustrates example training operation and inference operation of a machine learning model for determining probability distribution parameters, in accordance with example embodiments. By way of example, the ML model 302-1 of the RLD predictor system 300 of FIG. 3 is considered as the machine learning model in the example of FIG. 7. Also shown in FIG. 7 is the viewing database 110, a loss function module 702, and a model adjustment module 706. Each of these components and/or modules could be implemented as software, firmware, hardware, or some combination thereof. The components and modules in FIG. 7 serve to illustrate certain logical operations and relations in the present discussion. It should be understood that an actual implementation need not necessarily correspond to the representation depicted in FIG. 7. For example, more, fewer, and/or different components may be used in an actual implementation.

During training operation, shown above the horizontal line 729, a training dataset 701, which may be a subset of the viewing database 110, may be input to the ML model 302-1, as shown. The training dataset 701 may include the merged data 601 for a subset of panelists, historical timelines, and/or shows, for example. The ML model 302-1 may include one or more artificial neural networks (ANNs) that may be configured for generating θ-TV, θ-show, θ-entire_show, μ and K (and α and β derived therefrom) for a wide variety of historical viewing data, panelists, networks, and TV shows, among other recorded information, represented in the input training dataset 701. Non-limiting examples of types of information in the training dataset 701 may include specific panelists, demographic categories of the panelists, historical viewing activities of the panelists, networks and TV shows watched by the panelists, and characteristics of the TV shows (e.g., show type, genre, etc.). In some examples, the input training dataset 701 may include information about panelists even during times when they did not watch any TV. This may help avoid biases or other artifacts caused by otherwise considering only times when panelists were watching TV, for example.

The subset of merged data 601 in the training dataset 701 also supplies the actual observed data that the probability distributions are intended to model. These observed data, shown as ground-truth data 703 in FIG. 7, include historical viewing activities of the panelists as recorded in their respective historical buckets. Namely, the Boolean values for "watched_TV," "watched_show," "watched_entire_show," and the fractional value for "fraction_of_bucket_watched" for each panelist, each bucket, and each show. Buckets during which panelists watched no TV (or indications of such empty buckets) may also be included, as well as indications of which networks were watched. As indicated, during training the generated (or predicted) values of θ-TV, θ-show, θ-entire_show, μ and K (and α and β derived therefrom), as well as the ground truth data 703, may be input to the loss function module 702. The loss function module 702 may thus calculate a loss function 704, which may be considered as a representation of deviations between predicted and observed distributions of the observed data.

More specifically, for each of the Bernoulli parameters, a respective loss function may be expressed as a binary cross-entropy of the predicted (modeled) probability and the observed, ground-truth value. Thus, the loss function for θ-TV may be expressed as a binary cross-entropy of the modeled θ-TV and the true (observed) value of "watched TV." Similarly, the loss function for θ-show may be expressed as a binary cross-entropy of the modeled θ-show and the true (observed) value of "watched_show," and the loss function for θ-entire_show may be expressed as a binary cross-entropy of the modeled θ-entire_show and the true (observed) value of "watched_entire_show." For μ and K, the loss function may be computed as a negative logarithm of a probability density function (PDF) from a Beta distribution with parameters α and β for target values of "fraction_of_bucket_watched." This may provide a measure of how close the peak of the Beta distribution is to the true (observed) value of "fraction_of_bucket_watched."

The loss function 704 may then be expressed as the sum of the four above component loss functions. By computing the loss function 704 for the various combinations of the input training dataset 701, and adjusting the ML model 302-1 to minimize the loss function 704—an operation represented by the model adjustment module 706—the ML model 302-1 may effectively learn five different probability distribution parameters simultaneously. The trained ML model 302-1 may then be used at inference to predict the five probability distribution parameters for any combination of input criteria and previously unseen data from the viewing database 110.

More particularly, inference operation is represented below the horizontal line 729 in FIG. 7. Referring again to FIG. 3, a user may provide input criteria 301 to the RLD initializer 302 of the RLD predictor system 300. As noted above, input criteria 301 may include a panelist descriptor, a target show ID, a target network, a projected (planned) start time, and a network reach. For purposes of generating the probability distribution parameters, input criteria 301 may be input to the trained ML model 302-1; network reach may be omitted as ML model input, as indicated by the grayed-out font in FIG. 7. As indicated, an inference dataset 705 may also be input to (or accessed by) the trained ML model 302-1. The inference dataset 705 may represent a subset of the viewing database 110 not necessarily used in training the model.

In accordance with example embodiments, the output of the trained ML model 302-1 at inference may be a set of probability distribution parameters 303. Namely, inference values of θ-TV, θ-show, θ-entire_show, μ and K (and α and β derived therefrom). More specifically, the probability distribution parameters 303 may be determined for each panelist selected by the panelist descriptor (e.g., input demographic categories), for a target network, a target TV show ID, a projected start time, for each bucket, and for each possible lead-in condition of each bucket. Note that while the target show ID may be used to identify a particular TV show, the ML model 302-1 may only use characteristics of the identified show, such as type and genre, in predicting (inferring) the probability distribution parameters. This is consistent with using modeling to forecast audience performance for a new or planned TV show that may be characterized as being similar to one identified by the target show ID.

Figure 8:
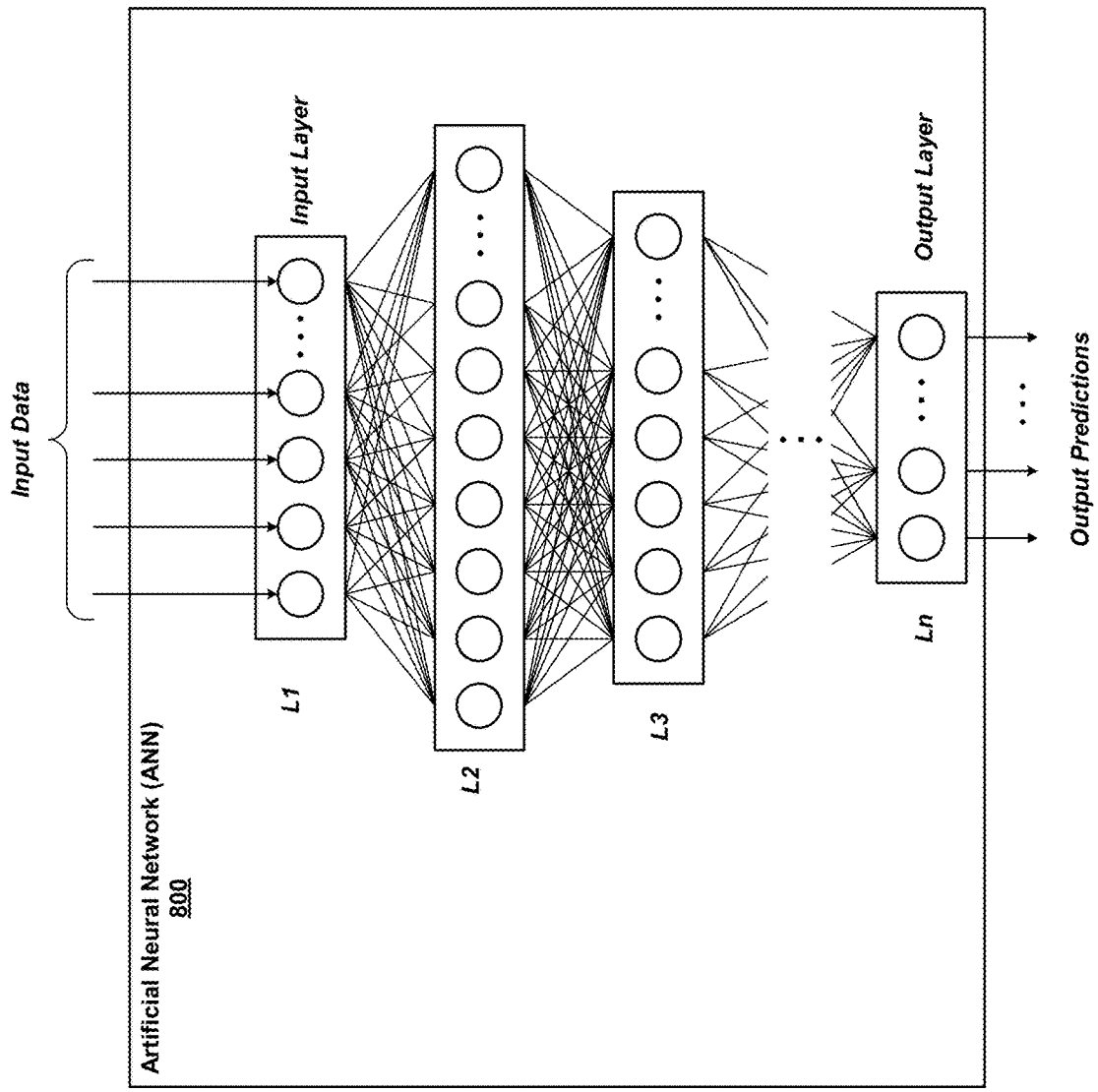
FIG. 8 is an example architecture of an example artificial neural network, in accordance with example embodiments.

As described above, a machine-learning model, such as ML model 302-1, may use one or more ANNs to perform the described operations. FIG. 8 illustrates an example architecture of an example artificial neural network 800, in accordance with example embodiments. As shown, the ANN 800 may be computationally constructed as a plurality of interconnected layers, including an input layer, labeled "L1"; an output layer, labeled "Ln"; and one or more intermediate layers, labeled "L2" and "L3" in this example. The ellipses between L3 and Ln represent one or more possible intermediate layers. In this example, there are n layers, with Ln labeling the nth layer. Each layer may be made up of one or more nodes having inputs and outputs. The inputs of nodes in one layer may be connected to the output of nodes of the preceding layer, except that the inputs to the nodes of the input layer receive input data, and the outputs of the nodes of the output layer provide a prediction that the input data matches one or another type of pattern that the ANN has been trained to recognize. Typically, training for recognition of a particular class of content in a given type of data, such as cats or dogs in image data, for example, may involve inputting training data that represents known or ground truth (training) examples of the particular class of content for which results are known, and then adjusting parameters (or weights) of the nodes in an ANN learning update procedure, such as back propagation, to maximize a probability that a predicted output by the ANN output (e.g., what the ANN "thinks" the input data represents) matches the training examples.

Considering the ANN 800 as an implementation of an ML-based model, such as ML model 302-1 of an RLD predictor system 300, the input layer L1 may be configured with one input node for each possible input data item, for example. In some embodiments, the input layer may include one or more additional input nodes for any possible ancillary information that may be input to the model.

As described above, the ML model 302-1 may be trained to predict probability distribution parameters. During training, the ground truth data 703 include binary variables. In accordance with example embodiments, an ANN or other ML-based model that calculates probabilities may be evaluated and adjusted based on binary ground truth data during training by an analytical technique involving binary cross-entropy/logloss. In particular, with binary cross-entropy/log loss, a loss function may be expressed as:

$$H_p(q) = -\frac{1}{N}\Sigma_{i=1}^{N} y_i \cdot \log(p(y_i)) + (1-y_i) \cdot \log(1-p(y_i)). \quad (3)$$

In equation (3), $y_i$, i=1, . . . , N are the ground-truth data, where $y_i=1$ corresponds to a successful test and $y_i=0$ corresponds to a failed test. In this example formulation, p(y) corresponds to the probability of success, and 1−p(y) corresponds to the probability of failure. During training, the parameters of the ANN or other ML-based model may be adjusted to minimize the loss function over all of the $y_i$, i=1, . . . , N. In some embodiments, other training and model adjustment techniques may be used. Using binary cross-entropy/log loss, among other possible techniques, may then yield a model having optimized parameters. The process may further involve achieving predicted probabilities that satisfy one or another threshold of statistical confidence.

For some types of applications in which an ANN is used, it may be configured to predict a probability or probabilities that a given input matches one or more elements or classes of elements of a known discrete set of elements or classes of elements. In this context, the ANN or the system in which it is implemented may be referred to as a "classifier," signifying a classification operation. A classifier may also be configured to make an actual selection from among a known discrete set of elements or classes of elements. For other types of applications in which an ANN is used, it may be configured to compute, given an input, a probable continuous value (e.g., a scalar) or set of values (e.g., a vector) as output, possibly together with confidence levels for the predicted output(s). In this context, the ANN or the system in which it is implemented may be considered as performing one or another form of regression analysis. Example embodiments of ML models described herein may include or employ either or both types of ANN implementations, in accordance with the descriptions herein. Further, other types of ANNs are possible, and may be used or included in example embodiments of ML model 302-1 described herein.

B. Example Probability Model Operations

In accordance with example embodiments, and referring again to FIG. 3, inference probability distribution parameters 303 of θ-TV, θ-show, θ-entire_show, μ and K (and α and β derived therefrom) generated by ML model 302-1 may be applied in the RLD model 304 of the RLD predictor system 300 to produce predicted ratings 307 for the given input data 301. As also shown in FIG. 3 and noted above, sampled lead-ins 305 generated by the sampled lead-in generator 302-2 from the input data 301 are also initially applied to the RLD model 304. The following discussion describes operations of the RLD model 304 (or similar functional component) based on the input data 301, the inferred probability distribution parameters 303, and sampled lead-ins 305. The inferred probability distribution parameters 303 may be generated as described by way of example above. Generation of the sample lead-ins 305 involves identifying a subset of panelists according to a panelist descriptor (e.g., demographic categories) in the input data 301, and determining initial lead-in variables for each identified panelist according to the target network, projected start time, and network reach criteria in the input data 301. Details of how initial sampled lead-in are determined are described in a subsequent section below.

At a high level, the RLD model 304 may perform a multiplicity M of simulated sample drawings from each the three Bernoulli distributions and the one Beta distribution for each of N selected panelists and in each of C (planned) buckets of a new or planned TV show of interest. The numbers M, N, and C are all positive integers. For each of the N selected panelists, the simulated Bernoulli samples generated in each given bucket are used to condition the Beta samples in the same given bucket in order to compute M samples of conditional probability values of fraction (or percentage) of the TV program of interest predicted to be watched in the given bucket. The M simulated Bernoulli samples generated in the given bucket are also applied as lead-in values for computations in the next bucket (immediately following the given bucket), in the manner described below. It may be noted that the sampled lead-ins 305 (to be discussed) provide the lead-in values for computation in the first bucket, since this bucket may otherwise lack lead-ins from simulated samplings of a preceding bucket.

Probability modeling that involves simulated sampling of random variables from probability distributions is sometimes referred to as Monte Carlo simulation. In an example application, a probability distribution may serve to approximate a process of interest, and Monte Carlo simulation may then be used to model outcomes of the process. The M simulated drawings from the Bernoulli and Beta distributions may also be considered Monte Carlo simulations, and are generally referred to as such in the following discussions.

Figure 9:
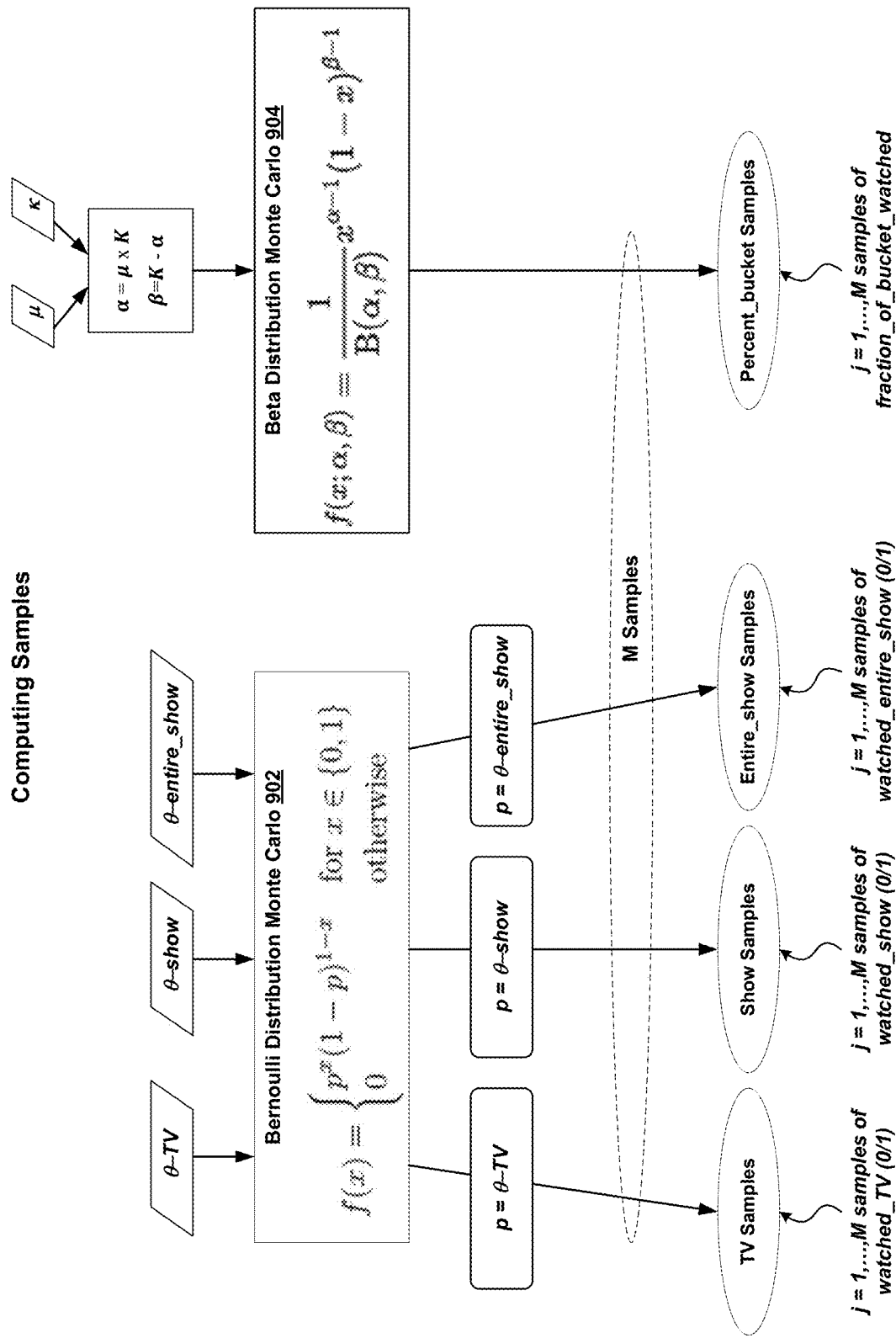
FIG. 9 illustrates certain aspects of computing ratings predictions, in accordance with example embodiments.

FIG. 9 illustrates certain aspects of computing ratings predictions, in accordance with example embodiments. In particular, FIG. 9 depicts computational paths of three Bernoulli distribution Monte Carlo simulations 902 and the Beta distribution Monte Carlo simulation 904. As indicated, the Bernoulli distribution is expressed again in the form of equation (1) above, and the Beta distribution is expressed again in the form of equation (2) above. The application of the three inferred Bernoulli parameters p of θ-TV, θ-show, θ-entire_show yield three different Bernoulli distributions for "watched_TV," "watched_show," "watched_entire_show," respectively. A Monte Carlo simulation of each Bernoulli distribution may then yield M simulated sample values for each of "TV samples," "Show Samples," and "Entire_show Samples," as indicated. Each set of samples may be indexed by j, where j=1, . . . , M. Each sample is a binary value of either zero (0) or one (1).

In a similar manner, the application of the inferred Beta parameters μ and K, where α=μ×K and β=K−α, may yield the Beta distribution for "fraction_of_bucket_watched." A Monte Carlo simulation of the Beta distribution may then yield M simulated sample values of "Percent_bucket Samples," which may be indexed by j, where j=1, . . . , M, as indicated. Each sample is a fractional value in the range [0, 1] inclusive.

As described below, the M simulated sample values for each distribution are computed for each of the N panelists and in each of the C buckets for each panelist. In an example embodiment, the number of samples may be M=10,000. It should be understood that other values of M may be used. The number of identified panelists N may depend on the total number of panelists in the viewing database 110 and the subset of those identified according to the demographic categories (and/or other panelist descriptor criteria) in the input data 301. A typical order of magnitude value may be N~10,000, however larger or smaller values are possible as well. The number of buckets that span a target TV show of interest may depend on the duration of the show and duration of each bucket. For 15-minute buckets, a one-hour show would have C=4 buckets, assuming the first bucket aligns with the projected starting time slot for the show. Again, other values of C are possible. In any case, the values of M, N, and C would all be known at least by the time model initialization is complete—e.g., by the time the RLD model 304 shown in FIG. 3 receives initial input.

Figure 10:
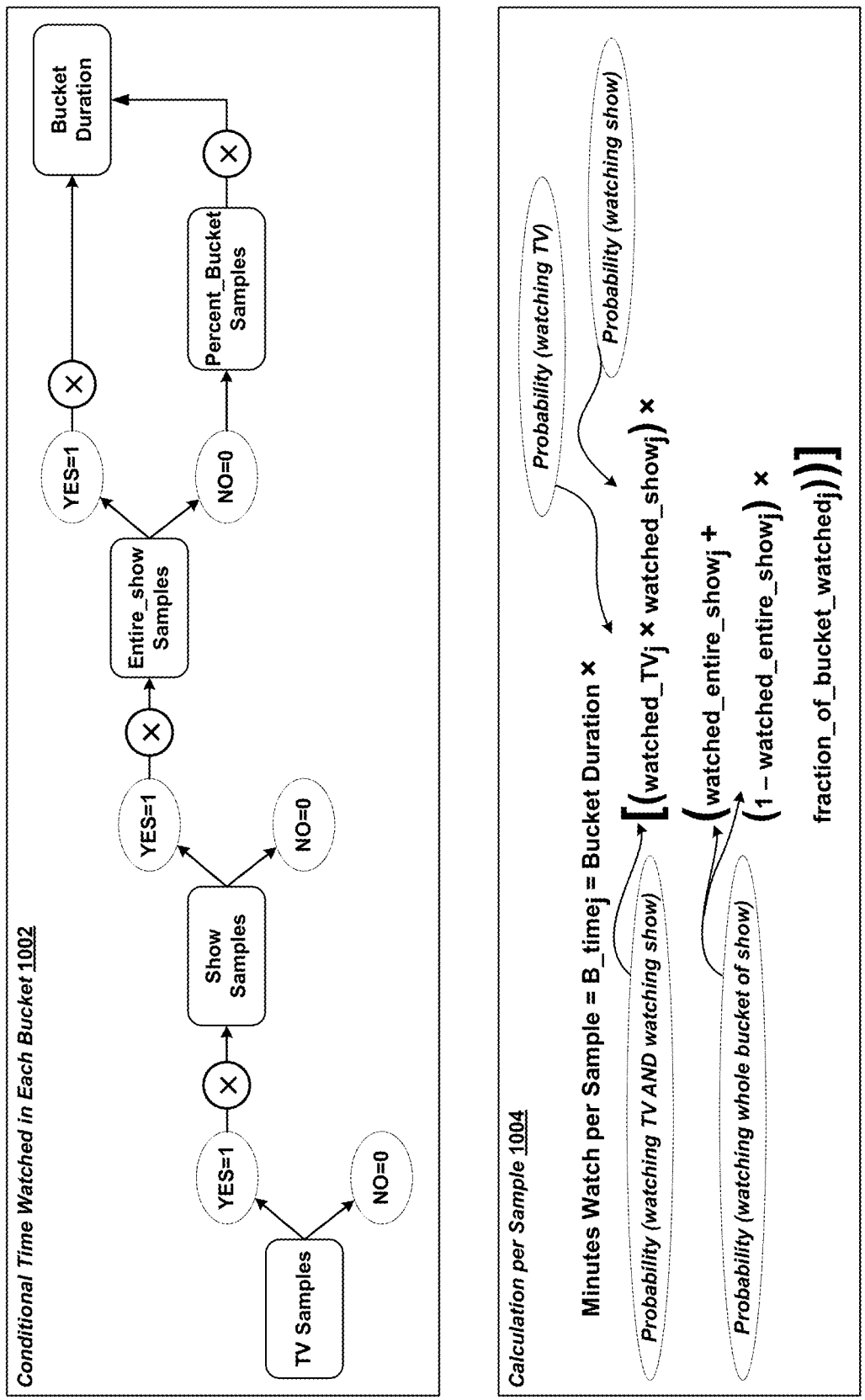
FIG. 10 illustrates certain additional aspects of computing ratings predictions, in accordance with example embodiments.

In accordance with example embodiments, a respective conditional probability of percent (or fraction) of the target TV show watched in each bucket by each panelists may be computed on a sample-by-sample basis using each of the M samples from each of the probability distributions. FIG. 10 illustrates two representations of the application of one sample from each Bernoulli distribution to calculation of one conditional probability of percent (or fraction) of the target TV show watched in a given bucket. A top panel 1002 labeled "Conditional Time Watched in Each Bucket" shows a logical flow of the determination, and a bottom panel 1004 labeled "Calculation per Sample" shows a corresponding arithmetic calculation.

As shown in the logical flow representation 1002, if a given TV sample is zero (0), then the fraction of the show watched in the bucket must also be zero, regardless of the values of the corresponding show sample and entire_show sample. If the TV sample is one (1), then the corresponding show sample may be applied as a condition. If the show sample is zero (0), then the fraction of the show watched in the bucket must again also be zero, regardless of the value of the corresponding entire_show sample. If the show sample is one (1), then the entire_show sample may be applied as a condition. If the entire_show sample is zero (0), then the value of the corresponding percent_bucket sample may be taken as the bucket duration. If the entire_show sample is one (1), the bucket duration may be taken as 100%, regardless of the value of the corresponding percent_bucket sample.

The arithmetic calculation 1004 of a conditional probability of percent (or fraction) of the target TV show watched for one sample may be considered a translation of the logical flow 1002 into logic instructions. The three lines of the calculation that involve the Bernoulli sample values account for either of the possible values of each binary variable. The correspondence between the arithmetic outcome and the logical-flow outcome may be verified by inspection. For both representations 1002 and 1004 in FIG. 10, the operations illustrated may be carried out for each of the M simulated samples on a sample-by-sample basis in order to then generate M samples of viewing time in each bucket, and for each panelist.

As discussed above, the Bernoulli sample values simulated for a given bucket may also be applied as lead-in values or conditions for the simulation in the next bucket. Specifically, the inventors have determined that the inferred Bernoulli and Beta parameter values predicted for a given bucket (and panelist) by a trained ML model, such as ML model 302-1, may depend on the lead-in conditions for the given bucket. Thus, for a given bucket (and panelist), the ML model may predict different values of the Bernoulli and Beta distribution parameters for different combinations of lead-in variables. When the ML-based parameters are applied for the Monte Carlo simulation of the samples in a given bucket, the Bernoulli and Beta distribution parameters used for each sample may then be determined or selected according to the Bernoulli samples from the previous bucket applied as lead-in values to the given bucket.

Figure 11:
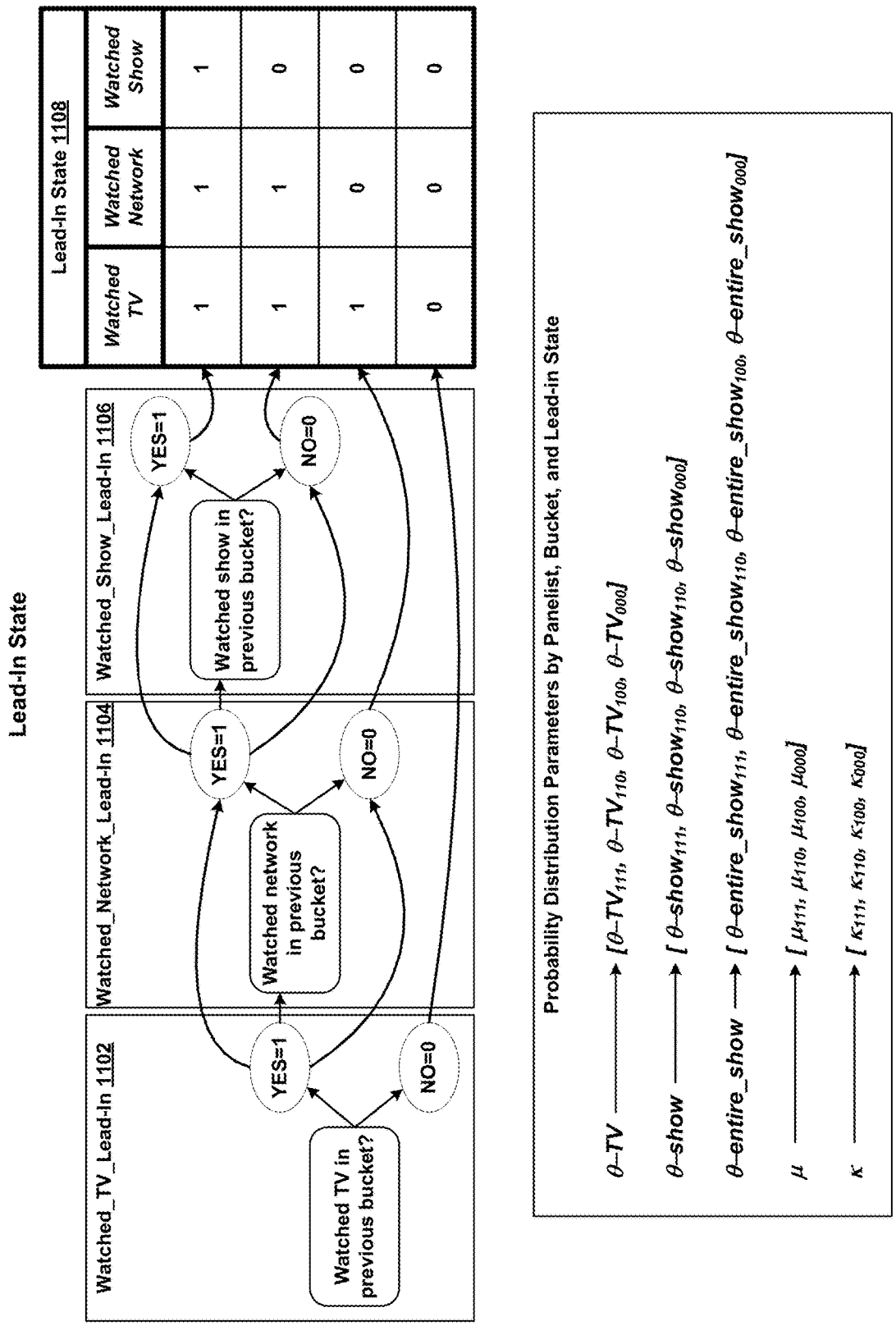
FIG. 11 illustrates certain still further aspects of computing ratings predictions, in accordance with example embodiments.

FIG. 11 illustrates how four different lead-in states correspond to four different combinations of three lead-in variable values. In accordance with example embodiments, the lead-in variables for a given bucket may be represented by three Boolean variables that encode three aspects of a panelist's viewing behavior during the immediately preceding bucket. Namely, "watched TV" encoding whether or not the panelist watched any TV during the preceding bucket; "watched network" encoding whether or not the panelist watched a specific network during the preceding bucket; and "watched show" encoding whether or not the panelist watched any of a specified TV show during preceding bucket. The lead-in state for a bucket may thus be represented as three-element vector v=[watched TV, watched network, watched show]. There are four possible combinations of elements of the lead-in vector v, as illustrated in FIG. 11.

The respective states of the three lead-in variables are shown at the top of FIG. 11 in three boxes labeled watched_TV_lead-in 1102, watched_network_lead-in 1104, and watched_show_lead-in 1106. The four possible lead-in states are listed in the table labeled lead-in state 1108, in which each of four rows corresponds to a different one of the four lead-in states.

Specifically, if all three lead-in values are one (1) or "yes," then the lead-in state may be represented by a lead-in vector v=[1, 1, 1] corresponding to the first row.

If watched_TV and watched_network are both one (1) or "yes" and watched_show is zero (0) or "no," then the lead-in state may be represented by a lead-in vector v=[1, 1, 0] corresponding to the second row.

If watched_TV is one (1) or "yes" and watched_network is zero (0) or "no," then watched_show must also be zero, and the lead-in state may be represented by a lead-in vector v=[1, 0, 0] corresponding to the third row.

Finally, if watched_TV is zero (0) or "no," then watched_network and watch show must both also be zero, and the lead-in state may be represented by a lead-in vector v=[0, 0, 0] corresponding to the bottom (fourth) row.

The arrows linking the various states of the individual lead-in variables shown in FIG. 11 trace the logical paths of the four possible lead-in vectors. In the context of the probability modeling described above, each sample of the triplet of Bernoulli distributions in a given bucket may yield the elements of one lead-in vector for the next bucket. Thus, the M simulated samples in the given bucket yield M lead-in vectors for the next bucket. Again, the sampled lead-in procedure described below may be used to generate M lead-in vectors for the first bucket of probability modeling.

The panel at the bottom of FIG. 11 illustrates how each inferred probability distribution parameter may have four values according to the four possible lead-in vectors. As shown, each of the four values of the probability distribution parameters is designated by a different subscript that encodes one of the lead-in vectors. For example, the four values of 0-TV may be represented as [$\theta\text{-TV}_{111}$, $\theta\text{-TV}_{110}$, $\theta\text{-TV}_{100}$, $\theta\text{-TV}_{000}$], and similarly for $\theta$-show, $\theta$-entire_show, $\mu$ and K This subscript notation is adopted in the discussion below. During Monte Carlo simulation in a given bucket, the appropriate value of the probability distribution parameters for each sample may then be selected according to the lead-in vector for that sample—i.e., one of the M lead-in vectors generated from the previous bucket.

In accordance with example embodiments, M lead-in vectors for each of a subset of N panelists may be represented as an array. FIG. 12 illustrates an example of such an arrangement. As shown, lead-in data 1202 may include N rows, one for each of N panelists, and M columns, each corresponding to one of M samples. The rows may be indexed by i, where i=1, . . . , N, and the columns may be indexed by j, where j=1, . . . , M. By way of example in FIG. 12, the four possible lead-in vectors are designate as $v_a$=[1, 1, 1], $v_b$=[1, 1, 0], $v_c$=[1, 0, 0], and $v_d$=[0, 0, 0]. Each element of the array may then hold one of the lead-in vectors. The particular lead-in vectors in lead-in data 1202 are arbitrary and shown by way of example. The array arrangement may be a convenient construct for the discussion of sampled lead-in generation, though it need not necessarily be instantiated in the manner shown for any particular implementation of probability modeling operations.

Figure 13:
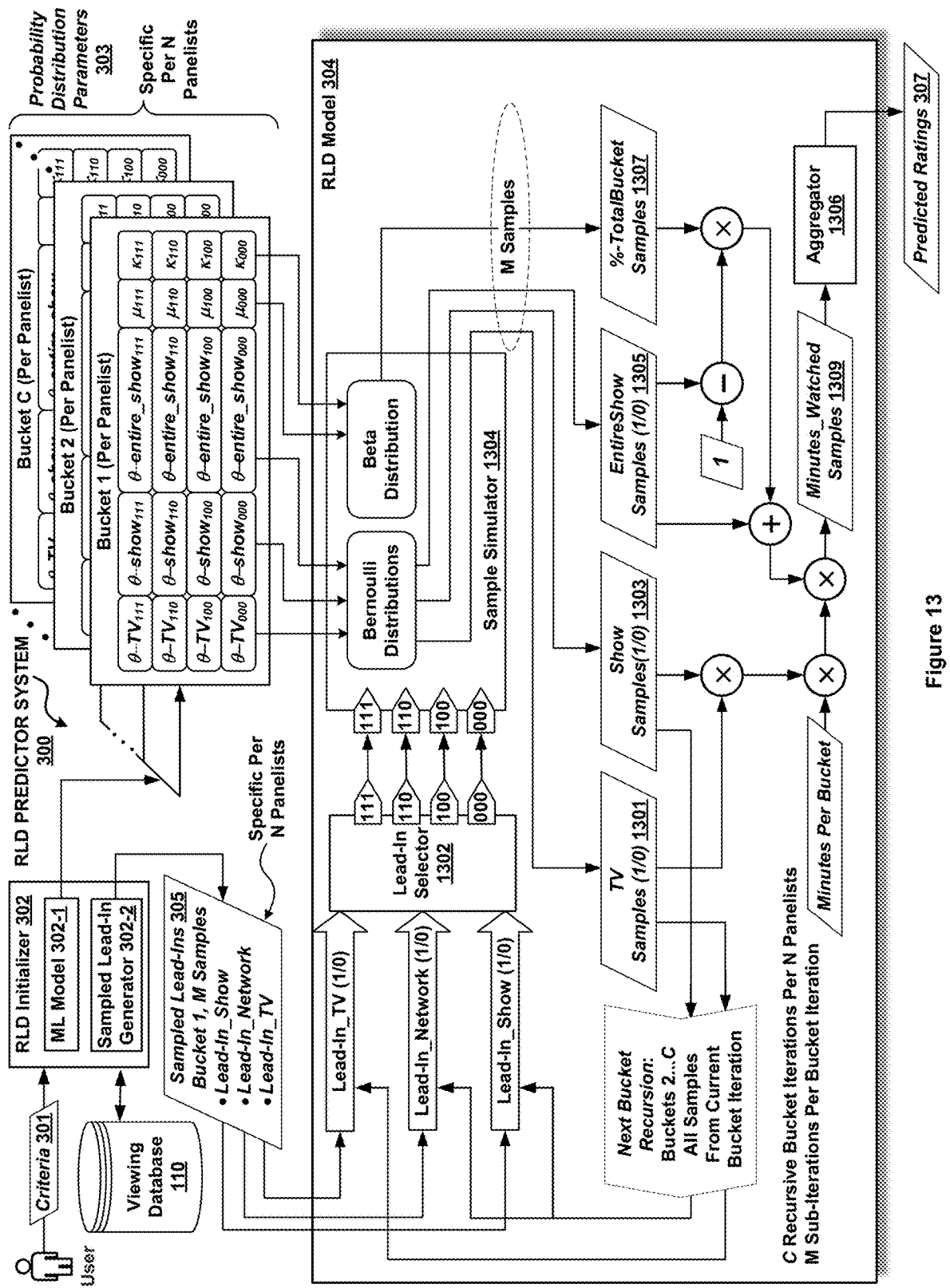
FIG. 13 illustrates an operational block diagram of an example respondent-level predictor system, in accordance with example embodiments.

FIG. 13 next illustrates an operational block diagram of an example respondent-level predictor system, in accordance with example embodiments. In particular, FIG. 13 may be considered an example version of RLD predictor system 300 of FIG. 3 with added details according to the discussion above in connection with ML-based modeling of probability distribution parameters, and Monte Carlo simulation of samples drawn from the probability distributions. The operations represented in FIG. 13 serve to illustrate various aspects of the modeling, and may not necessarily directly correspond to specific computational techniques of a particular implementation. Similarly, some of the components shown in FIG. 13 serve to illustrate aspects of modeling operations, but may not necessarily be part of a particular implementation or used in the exact manner shown.

Summarizing FIG. 3 again, a user (again, not to be confused with a panelist or an "end-user" who consumes multimedia data and may serve as a panelist) may provide input criteria 301 to the RLD initializer 302. The ML model 302-1 of the RLD initializer 302 may apply a trained ML model to determine the inferred probability distribution parameters 303, as described above. The sampled lead-in generator 302-2 of the RLD initializer 302 may generate the sampled lead-ins 305 in a manner described below. The RDL initializer 302 may also access the viewing database 110 for the initializing operations. The probability distribution parameters 303 and the sampled lead-ins 305 may be provided to the RLD model 304, which then generates predicted ratings 307.

Aspects of these summarized operations may be detailed in FIG. 13, as follows. The probability distribution parameters 303 may be seen as including four values of each of $\theta$-TV, $\theta$-show, $\theta$-entire_show, $\mu$ and K, for each of N panelists and each of C buckets, where the N panelists may be identified and/or selected according to demographic categories in the input criteria 301. The value of C will depend on the planned duration of the target show of interest. As shown, the probability distribution parameters for a given panelist and given bucket may be represented as a table, where each row is a set of the five parameters $\theta$-TV, $\theta$-show, $\theta$-entire_show, $\mu$ and K, and each column represents a different one of the four possible lead-in vectors.

For each panelist, the sampled lead-ins 305 determined for the first bucket ("bucket 1") may include M lead-in vectors, each specifying lead-in_TV, lead-in_network, and lead-in_show. Thus, for a given panelist, the sampled lead-ins may correspond to one row of the lead-in data 1202 shown in FIG. 12 for the case in which the lead-in data 1202 are generated by the sampled lead-in procedure described below. In some examples, the value of lead-in_show for a given sample may be taken to be equal to the value of lead-in_network for that sample. This is discussed below.

In FIG. 13, the RLD model 304 is depicted as including a lead-in selector 1302, a sample simulator 1304, and aggregator 1306. Additionally, various data items are also designated in the example operations illustrated. The sample simulator 1304 may implement computational operations for Monte Carlo simulations with the three Bernoulli distributions and the Beta distribution. In accordance with example embodiments, the probability distribution parameters 303 may be applied in these Monte Carlo simulations, as indicated by the arrows from the probability distribution parameters to the functional components labeled "Bernoulli Distributions" and "Beta Distribution" in the sample simulator 1304.

Also in accordance with example embodiments, the three lead-in variables of each lead-in vector of a sample—either from the sampled lead-ins 305 for the first bucket, or from Bernoulli samples from the preceding bucket for bucket #2 through bucket C—may be input to the lead-in selector 1302. For each sample the lead-in selector 1302 may determine the lead-in state, and then effectively select which set of $\theta$-TV, $\theta$-show, $\theta$-entire_show, $\mu$ and K should be applied to the Monte Carlo simulation of each probability distribution for the sample. For each panelist, this operation may be repeated as an iteration over M simulated drawings to generate M samples of each of TV samples 1301, show samples 1303, entire_show samples 1305 and %-total_bucket samples 1307, as indicated. This sample-by-sample computation of the M simulated samples may be considered as implementing the similarly illustrated computations depicted in FIG. 9 and discussed above.

In further accordance with example embodiments, a sample-by-sample computation of conditional minutes watched 1309 by each panelist may be computed according to the arithmetic operations depicted below the TV samples 1301, show samples 1303, entire_show samples 1305 and %-total_bucket samples 1307. These arithmetic operations may be considered as implementing the similarly illustrated arithmetic computations 1004 in FIG. 10 and also discussed above.

As indicated, the TV samples 1301 and show samples 1303 in a given bucket, starting with the first bucket, are provided as lead-ins for the next bucket. In an example embodiment, the show samples 1303 are used as both the lead-in network variables and lead-in show variables. The dependency of probability distribution parameters applied in a given bucket on lead-in vectors from the previous bucket may be considered as introducing a recursion relation between the probability modeling in successive buckets. This is represented by a block labeled "Next Bucket Recursion . . . " As noted above, the lead-in variables for the first bucket are provided by the sampled lead-ins 305.

The operations illustrated above may be carried out for each panelist and each of the C buckets. Once all iterations are complete, or possibly on an incremental basis, the total minutes watched samples 1309 may be aggregated across buckets and across panelists to generate an M-sample distribution of predicted total minutes watched of a new or planned show of interest for which the simulations were carried out. Applying a panelist-specific weighting to weighted averages across all panelists for each sample may then convert M-sample distribution of predicted minutes watched to an M-sample distribution of predicted ratings.

Figure 14:
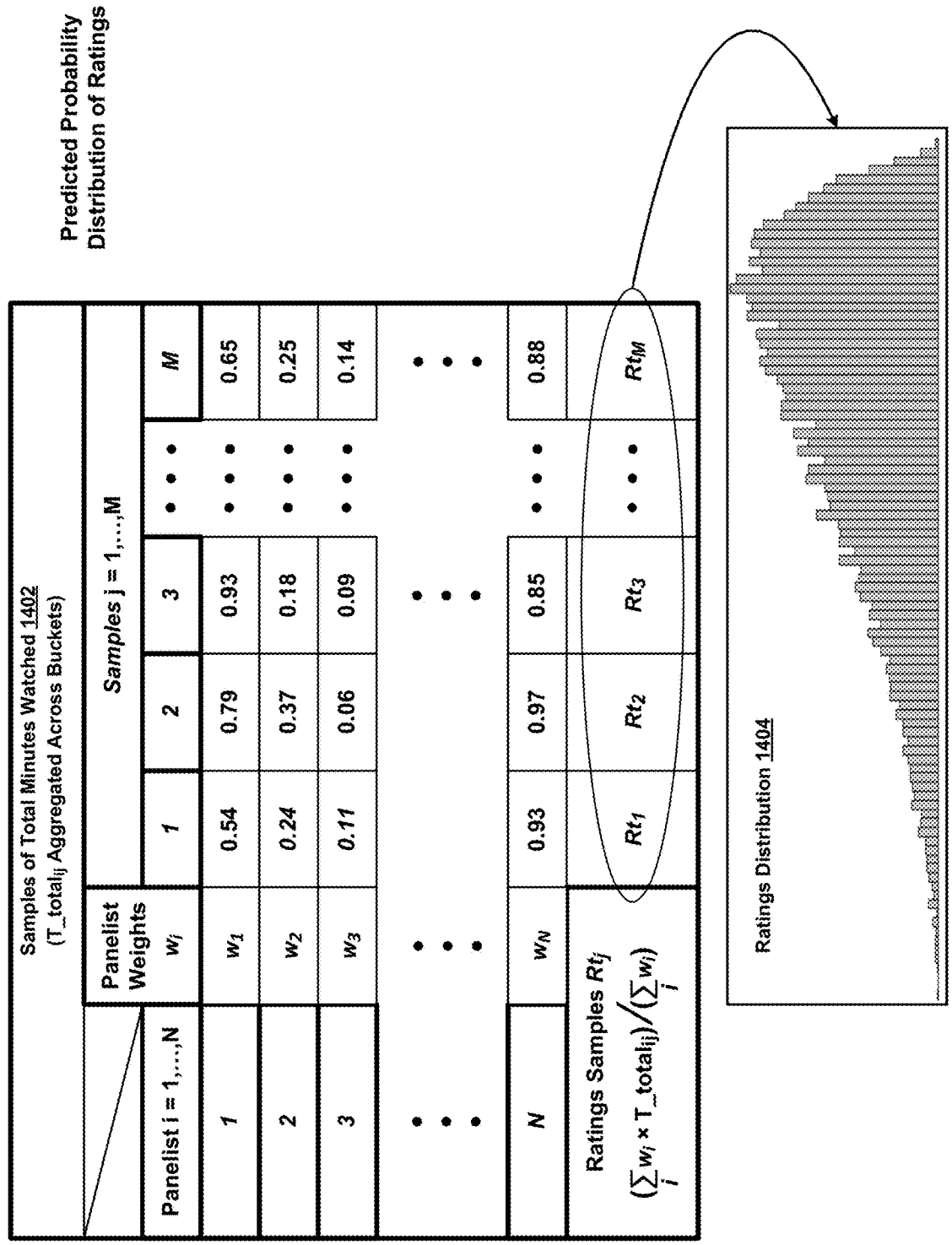
FIG. 14 illustrates an example of ratings prediction data format, in accordance with example embodiments.

FIG. 14 illustrates an example of such a predicted ratings distribution 1404 generated from an aggregation of samples of total minutes watched 1402, in accordance with example embodiments. In practice, among a set of panelists specified according to demographic criteria, for example, ratings for a TV show may be expressed as a function of the total amount of time of the TV show watched by all the panelists of the set. More specifically, the ratings may be computed as a weighted average of time watched across all the panelists. In an example embodiment, a specific weighting value may be applied to each panelist. The weighting value may be determined according to statistical factors aimed at accounting for biases and/or possible systematic skews that may be introduced into the analytical results by the particular selection of panelists, for example. There may be other factors in determining weights as well.

As shown, the samples of total minutes watched 1402 may be represented as an array or table, where each row corresponds to one of N panelists, indexed by $i=1, \ldots N$, and where each column corresponds to one of M samples, indexed by $j=1, \ldots, M$. A column preceding column $j=1$ lists the weights $w_i$, $i=1, \ldots N$, for each panelist. Each entry, $T\_total_{ij}$, in the table corresponds to one sample, j, for one panelist, i, of a fraction of the total duration of the TV show of interest that the panelist is predicted to watch, as determined from the computations described above (e.g., in connection with FIG. 13). Multiplying $T\_total_{ij}$ by the duration of the TV show yields the amount of viewing time represented by $T\_total_{ij}$.

In accordance with example embodiments, computing a weighted average over each column then gives M samples of predicted ratings, $Rt_j$, displayed across a final row beneath panelist i=N. As indicated, the weighted average of each column may be expressed as:

$$Rt_j = \frac{\Sigma_i w_i \times T\_total_i}{\Sigma_i w_i}. \quad (4)$$

A graphical rendering of the samples of predicted ratings is shown as a ratings distribution 1404 at the bottom of FIG. 14. It should be understood that the values of the table entries are illustrative, but otherwise arbitrary. Similarly, the form and shape of the particular ratings distribution 1404 are also illustrative, but otherwise arbitrary.

Advantageously, the RLD predictor system 300 may be used to generate predicted ratings for a wide variety of input criteria data 301, thereby enabling a user, for example, to study expected effects of various factors on predicted ratings. For each combination of input criteria data, predicted ratings, whether in graphical form or numeric form, may thus be used to investigate various predicted statistical properties of the predicted ratings for one or more TV shows of interest. Such investigations may be useful for addressing expected ratings among various combinations of planned TV shows and demographic categories, different planned broadcast schedules, and (as described in more detail below), network reach. These are just a few examples of how RLD-based predictions may be determined and applied.

It should be understood that representation of operations shown in FIGS. 13 and 14 are depicted in a form convenient and suited for explanation of how the computational results may be achieved. Thus, for example, FIG. 13 suggests sequential operations on a sample-by-sample basis for each panelist and in each bucket. In any given specific implementation, various computational and numerical techniques may be applied that achieve the same results with different operations. For example, operational data may be structured as arrays, vectors, matrices, and/or tensors, and processed concurrently and/or in parallel on more than one processor. An examination of the operational details of such an implementation might yield a logical architecture that differs from that of the representation of FIG. 13. However, both representations may be effectively equivalent in terms of the elemental computations performed and the analytical results.

C. Sampled Lead-In Methodology

As discussed above in connection with probability modeling across a sequence of buckets of a TV show of interest, the computations in each successive bucket are recursively related to the computational results in the previous bucket. More specifically, the Bernoulli samples from a current bucket may be used as lead-in values for the selection of probability distribution parameters for Monte Carlo simulations in the next bucket. However, since the probability modeling begins with the first bucket of a sequence, there are no simulated samples generated in the bucket that precedes the first bucket. Thus, lead-in vectors for the first bucket may need to be determined by a different methodology. Accordingly, the inventors have devised an analytical framework for determining "sampled lead-ins" from historical viewing data, separately from the recursive approach used in all buckets following the first bucket.

The following example usage scenario may help provide context. A user, such as a TV network executive, may wish to forecast ratings among panelists of a particular combination of demographic categories for a not-yet-aired new TV show. The new TV show may be characterized similarly to an existing TV show (e.g., same type, genre, etc.). By way of example, the new show may be one hour in duration (e.g., four buckets), and may be planned for broadcast by a target network at a projected scheduled time slot, such as Wednesdays at 8:00 pm. Using an RLD-based prediction system, such as RLD predictor system 300, the user may provide input criteria 301 that includes information indicative of a panelist descriptor corresponding to the demographic categories, a target show ID that identifies the existing TV show deemed similar to the new show, the target network, and the projected starting time slot.

In addition, the input criteria 301 may include a "target network reach," which may correspond to a fraction or percentage of all panelists, selected according to the panelist descriptor, who are expected, assumed, or estimated to be watching the target network at the start of the first bucket—e.g., watching the target network in the bucket preceding the first bucket (e.g., during the Wednesday, 7:45 pm time slot for the current example usage scenario). The particular input criteria 301 may be considered hypothetical, in the sense that it is used in forecasting and/or investigating predicted ratings for different show-planning configurations. For purposes of the present discussion, the target network reach may be referred to as "R*."

In accordance with example embodiments, historical viewing data of the panelists selected according to the panelist descriptor may be used to generate an array of lead-in vectors of the form illustrated by way of example in FIG. 12, such that among all the selected panelists, the percentage for whom the watched_network variable is true is within a specified tolerance of the target network reach (or a function thereof), for each of a multiplicity of samples that form the columns in the array. As described below, the sampled lead-in methodology may be used to achieve this result, as well as to correspondingly determine the watched TV and watched_show variables of each lead-in vector. As such, the array of lead-in vectors determined using the sampled lead-in methodology may provide the lead-ins for the first bucket of the probability modeling described by way of example above.

Sampled lead-in methodology may be understood by considering example operation, which may be carried out by the sampled lead-in generator 302-2, for example. Thus, following the notation and configurations described above, sampled lead-in may be applied to generate M lead-in vectors for each of N panelists, where the N panelists are a subset of all panelists, selected according to the panelist descriptor or some other form of input selection criteria. For purposes of the present discussion, the bucket in which the sampled lead-ins are determined (e.g., the Wednesday, 7:45 pm bucket in the above example) may be referred to as the "context bucket" or "context time slot."

In accordance with example embodiments, historical viewing data (e.g., from the viewing database 110) may be analyzed to determine a "historical network reach" for the N panelists for the context bucket. For purposes of the present discussion, the historical network reach may be referred to as "$R^h$." Since the target network reach specified in the input criteria 301 may be viewed as hypothetical (in the sense described above), it need not necessarily agree with an empirically-determined historical network reach. Conceptually, the sampled lead-in procedure may be considered as shifting observed statistical metrics of historical viewing activities corresponding to $R^h$, in order to determine computationally-specified statistical metrics of predicted viewing activities corresponding to R*. The resulting predicted viewing activities may then correspond to the component variables of desired lead-in vectors. In further accordance with example embodiments, the shift may be determined subject to various constraints aimed at ensuring logical consistency (e.g., probabilities in the range [0, 1]), adherence to specified tolerance thresholds, and statistical independence of samples of lead-in vectors.

Example operations for determining sampled lead-in may be described as follows. An N-row by M-sample "network indicator" array may be constructed, where each row corresponds to one of the N selected panelists, indexed by i, and each column corresponds to one sample, indexed by j. Each entry in the array, $I_{ij}$, is a Boolean variable indicating for the $j^{th}$ sample whether or not the $i^{th}$ panelist watched the target network for at least a minimum amount of time (e.g., one minute) during the context bucket. If so, then $I_{ij}=1$; otherwise, $I_{ij}=0$. For each column, all entries for which $I_{ij}=1$ identify a "network lead-in set" of panelists—i.e., all panelists who, for a given sample corresponding to a given column, watched the target network (for at least the minimum amount of time). Thus, the network indicator array includes M network lead-in sets (allowing for the possibility of empty sets), in addition to entries $I_{ij}=0$ outside of the network lead-in set of each column.

For each column, an average of across all N panelists yields a fraction of all panelists in the network lead-in set for the column, and therefore corresponds to one sample of network reach. More specifically, for each column a "sampled network reach," $R_j$, may be computed as a straight average according to:

$$\forall j \in \{1, \ldots, M\}: R_j = \frac{1}{N}\sum_{i=1}^{N} I_{ij}. \quad (5)$$

Following from the explanation of weightings above in connection with ratings, $R_j$ may be alternatively computed as weighted average according to:

$$\forall j \in \{1, \ldots, M\}: r_j = \frac{\Sigma_i w_i I_{ij}}{\Sigma_i w_i}. \quad (6)$$

In the following discussion, the form of $R_j$ expressed in equation (6) is adopted. However, this should not be viewed as limiting with respect to example embodiments.

In accordance with example embodiments, sampled lead-ins may be determined by constructing a network indicator array, guided by and consistent with the historical viewing data, such that for each column, $R_j \approx R^*$ to within a specified tolerance. This may be achieved by considering the network indicator array first as being modeled on historical viewing data for the N panelists, so as to be aligned with $R^h$, and then determining an adjustment or shift in order to align it with R*. The historical viewing data may be analyzed to define for the $i^{th}$ panelist a probability, $p_i^h$, of being in a "historical network lead-in set." In terms of the network indicator array, $p_i^h$ may be expressed for each of the N panelists as an average of $I_{ij}$ across all M samples:

$$\forall i \in \{1, \ldots, N\}: p_i^h = \lim_{M \to \infty} \frac{1}{N}\Sigma_{j=1}^{M} I_{ij}. \quad (7)$$

Defined in this way, the historical network reach may be expressed as:

$$R^h = \frac{\Sigma_i w_i p_i^h}{\Sigma_i w_i}. \quad (8)$$

In a similar manner, the target network reach may be expressed as:

$$R^* = \frac{\Sigma_i w_i p_i}{\Sigma_i w_i}, \quad (9)$$

for some probability, $p_i$, that the $i^{th}$ panelist will be in the network lead-in set that aligns with R*. The probability $p_i$ may be determined as described below.

In order to align $R^h$ with R*, $p_i$ may be expressed in terms of a shift or adjustment to $p_i^h$:

$$p_i = p_i^h + \delta, \quad (10)$$

where $\delta$ is a fixed amount. From equations (8) and (9) it then follows that:

$$\frac{\Sigma_i w_i (p_i^h + \delta)}{\Sigma_i w_i} = R^* \Rightarrow \delta = \frac{\Sigma_i w_i (R^* - p_i^h)}{\Sigma_i w_i} = R^* - R^h. \quad (11)$$

Thus, with $p_i^h$ determined from the historical viewing data, and given known weights $w_i$, a shift, $\delta$, may be determined that enables sampled lead-ins consistent with R* to be derived.

It is first noted that since both R* and $R^h$ are in the range [0, 1], $\delta$ is in the range [−1, 1]. It is therefore possible for the value of $p_i$ defined by equation (10) to fall outside the range [0, 1] for some indices i, depending on the value $\delta$ and of $p_i^h$. Since $p_i$ is a probability, values of $p_i<0$ or $p_i>1$ are non-physical. Accordingly, the inventors have devised a technique for "clamping" all values of $p_i$ determined from equation (10) as falling outside of the range [0, 1] to the range boundary exceeded (i.e., 0 or 1), and for redistributing a form of an average of excess residuals from the excesses among the values of $p_i$ that do not fall outside of the range. The clamping and redistribution procedure may be carried out iteratively until the average of the residuals falls to or below a specified threshold, and/or a maximum number of iterations has been carried out.

An example embodiment of the clamping procedure may be described as follows. Equation (10) for $p_i$ may be rewritten as:

$$p_i = \text{clamp}(p_i^h + \delta, [0,1]), \quad (12)$$

which specifies that if $p_i^h + \delta > 1$, it will be clamped to 1, and if $p_i^h + \delta < 1$, it will be clamped to 0. Note that for any particular set of iterations, the value of $\delta$ (if other than 0) is fixed at either greater than zero or less than zero. Thus, for all iterations of the set, it is only possible to have instances of $p_i^h + \delta > 1$ or if $p_i^h + \delta < 1$, but not both. Designating $p_i^{>1}$ for $p_i^h + \delta > 1$ in a set of iterations with $\delta > 0$, and $p_i^{<0}$ for $p_i^h + \delta < 0$ in a set of iterations with $\delta < 0$, a clamping weight, $w_{clamp}$, may be computed as:

$$w_{clamp} = \Sigma_i [(p_i^{>1} - 1) + p_i^{<0}], \quad (13)$$

which is a sum of all overflows greater than one for iterations with $\delta > 0$, or a sum of all underflows less than zero for iterations with $\delta < 0$. Note that, as with equation (12), equation (13) applies to either $p_{>1}$ or $p_{<0}$, but not both at the same time in one iteration set. Thus, equations (12) and (13) are written to cover both cases, but only one case at a time applies to any given set of iterations.

Next, designating $p_i^{mid}$ for $0 \leq p_i^h + \delta \leq 1$, and $l_{mid}$ to be the number of values of $p_i^{mid}$, an average value of the $w_{clamp}$ may be redistributed among all $l_{mid}$ values of $p_i^{mid}$ according to:

$$p_i^{mid} \to p_i^{mid} + \frac{w_{clamp}}{\ell_{mid}}. \tag{14}$$

Clamping and redistribution on the first iteration replaces all $p_i^h$ with the $l_{mid}$ redistributed values of $p_i^{mid}$ plus all the $p_i^h + \delta$ values that were clamped at either 0 or 1. The next iteration repeats the clamping and redistribution procedure, but starting with the replaced values of $p_i^h$, and so on. Repeated iterations may be carried out until either the average of $w_{clamp}$ or a residual thereof falls to or below a specified threshold, and/or a maximum number of iterations has been carried out.

The result of the clamping and redistribution procedure is a set of respective probabilities, $p_i$, for the N selected panelists that may be used for generating M network lead-in sets, as described below. Before clamping and redistribution may be carried out, however, $p_i^h$ may first need to be determined, and this determination may also need to account for the N selected panelists' historical viewing activities regarding overall TV viewing—i.e., whether or not individual panelists watched any TV at all during the context bucket, and/or whether they watch networks other than the target network during the context bucket.

In accordance with example embodiments, and in a manner analogous to the discussion above of the network indicator array and the formulation of $p_i^h$, an N-row by M-sample "TV indicator" array may be constructed, where each entry, $T_{ij}$, is a Boolean variable indicating for the $j^{th}$ sample whether or not the $i^{th}$ panelist watched any TV during the context bucket. If so, then $T_{ij} = 1$; otherwise, $T_{ij} = 0$. For each column, all entries for which $T_{ij} = 1$ identify a "TV lead-in set" of panelists—i.e., all panelists who, for a given sample corresponding to a given column, watched any TV. Thus, the TV indicator array includes M TV lead-in sets (allowing for the possibility of empty sets), in addition to entries $T_{ij} = 0$ outside of the TV lead-in set of each column.

Following the reasoning for the definition of $p_i^h$, the historical viewing data may be analyzed to define for the $i^{th}$ panelist a probability, $q_i^h$, of being in a "historical TV lead-in set." In terms of the TV indicator array, $q_i^h$ may be expressed for each of the N panelists as an average of $T_{ij}$ across all M samples:

$$\forall i \in \{1, \ldots, N\}: q_i^h = \lim_{M \to \infty} \frac{1}{N} \sum_{j=1}^{M} T_{ij}. \tag{15}$$

It should be evident that any of the selected panelists in the network lead-in set are also in the TV lead-in set. That is:

$$\forall i,j: I_{ij} = 1 \Rightarrow T_{ij} = 1. \tag{16}$$

For all of the other selected panelists, the probability that they are in the TV lead-in set, but not in the network lead-in set may be expressed as:

$$q_i = q_i^h - p_i^h. \tag{17}$$

That is, $q_i$ is the probability that panelist i watched TV but not the target network during the context bucket.

The inventors have recognized that because both $q_i^h$ and $p_i^h$ are probabilities of observed Boolean events—e.g., either "success" or "failure"—that are recorded in the historical viewing activities of the selected panelists, the probability distributions of the events may be modeled as Beta distributions in a manner similar to that described above, for example. Specifically, from the historical viewing timeline (or some portion thereof) of panelist i, the following observed variables may be defined:

$L_i^{TV}$ = number of times panelist i was in the TV lead-in set (watched any TV), $L_i^{net}$ = number of times panelist i was in the network lead-in set (watched the target network), B = number of buckets in the historical timeline (or portion thereof) of panelist i.

It follows that the number of times panelist i did not watch any TV is given by $B - L_i^{TV}$, and the number of times panelist i watched TV but not the target network is given by $L_i^{TV} - L_i^{net}$.

Expressing the Beta distribution of equation (2) as Beta $(\alpha, \beta)$, where, again, $\alpha$ is an observed number of successes and $\beta$ is an observed number of failures for a Boolean event, it follows that $q_i^h$ may be expressed as:

$$q_i^h \sim \text{Beta}(L_i^{TV}, B - L_i^{TV}). \tag{18}$$

Similarly, defining $\hat{p}_i$ as the probability that panelist i was watching the target network among all buckets during which panelist i watch any TV at all, $\hat{p}_i$ may be expressed as:

$$\hat{p}_i \sim \text{Beta}(L_i^{net}, L_i^{TV} - L_i^{net}). \tag{19}$$

Finally, noting that $p_i^h$ may be considered a conditional probability of panelist i watching the target network during the context bucket, given that panelist i watched any network during the context network, $p_i^h$, may be expressed as:

$$p_i^h = q_i^h \times \hat{p}_i. \tag{20}$$

With $p_i^h$ thus determined from the historical viewing data, and $p_i$ derived from $p_i^h$ using the clamping and redistribution procedure, construction of a network indicator array that aligns with $R^*$, as desired, may be accomplished as follows. A respective Bernoulli distribution with parameter $p_i$ may be used to simulate M drawings of $I_{ij}$, $j = 1, \ldots, M$, for each of the $i = 1, \ldots, N$ selected panelists. Each M-sample drawing thus corresponds to one row of the network indicator array. By construction, $R_j$ computed according to equation (6) for each column should be close to $R^*$; i.e., $R_j \approx R^*$ to within a specified tolerance, $\varepsilon$. The tolerance condition may be expressed as $|R_j - R^*| \leq \varepsilon$ for all j. However, since the Bernoulli distribution represents a random process, it is possible that $|R_j - R^*| > \varepsilon$ for one or more values of the index j.

In order to account for instances where the tolerance is exceeded, any column of the constructed network indicator array for which $|R_j - R^*| > \varepsilon$ may be effectively rejected and replaced by resampling the Bernoulli distribution for each selected panelist. Note that all M re-samplings need not necessarily be performed (except for an unlikely case in which $|R_j - R^*| > \varepsilon$ for every column j). Thus, for example, if $|R_j - R^*| > \varepsilon$ for 27 out of M columns, then those 27 columns may be rejected, and 27 re-samplings for each of the N panelists may be performed to generate 27 replacement columns for the 27 rejected columns. Following any necessary rejection/re-sampling/replacement of columns, the replaced columns may then be evaluated for the tolerance condition. Additional rejection/re-sampling/replacement iterations may be repeated until $|R_j - R^*| \leq \varepsilon$ for all j, and/or a threshold number of such iterations have been carried out. Each time a rejection/re-sampling/replacement iteration is necessary, the number of re-samplings per panelist will be no greater than the number needed for the previous iteration, and likely will be smaller. In this sense, it may be expected that iterations may lead to convergence.

In accordance with example embodiments, a network indicator array constructed as described above may be considered as all samples of the "lead-in_network" component of all the M lead-in vectors for all N selected panelists. The other lead-in vector components—i.e., "lead-in_TV" and "lead-in_show"—for the M lead-in vectors for each of the N selected panelists may be determined by constructing the TV indicator array, as follows. A respective Bernoulli distribution with parameter $q_i$ determined according to equation (17) may be used to simulate M drawings of $T_{ij}$, j=1, . . . , M, for each of the i=1, . . . , N selected panelists. Each M-sample drawing thus corresponds to one row of the TV indicator array, but excluding context buckets in which panelists watched the target TV network. This follows from the definition of $q_i$. In order to include the "omitted" buckets, every $T_{ij}$ for which the corresponding $I_{ij}$=1 may also be set to 1. This operation results in the TV indicator array as defined above—namely, in which each column includes a sampled TV lead-in set.

A "show indicator" array may next be constructed as a duplication of the network indicator array. This follows because the target TV show has not yet begun in the context bucket, so each of the lead-in_network variable provides an appropriate indicator for a panelist effectively "preparing to watch" the show when the first bucket begins (at the end of the context bucket).

Finally, the TV indicator array, network indicator array, and show indicator array may be combined on an element-by-element basis to create a lead-in vector array of the form illustrated in FIG. 12, for example. The lead-in vector array, determined according to the above example of sampled lead-in procedure, may then be applied as initial lead-ins to the probability modeling procedure described above by way of example.

As with the example probability modeling operations, it should be understood that representation of example sampled lead-in operations are described above and in connection with equations (5)-(20) by way of example, and in a form convenient and suited for explanation of how the computational results may be achieved. For any given implementation, different forms of analytical expressions may be used. For example, operational data may be structured as arrays, vectors, matrices, and/or tensors, and processed concurrently and/or in parallel on more than one processor. An inspection of the operational details of such an implementation might involve steps and/or numerical techniques that appear to differ from computational formulations and expressions presented above. However, the analytical framework presented remains valid and applicable to other formulations and/or implementations.

In addition, it should be further understood that some details of the analytical framework could be altered and/or modified, without limiting the scope of example embodiments. For example, historical probabilities, such as $p_i^h$ and/or $q_i^h$, could be determined by techniques other than using Beta distributions. One such alternative approach to determining ph, for example, could be to empirically determine from the historical viewing activity data a numerical frequency of the context bucket during which panelists viewed the target network, compared with the total number of buckets in panelists' historical viewing timelines. These, and other possible alternative analytical procedures remain consistent with the overall analytical framework of sampled lead-ins as described above.

IV. Example Methods

Figure 15:
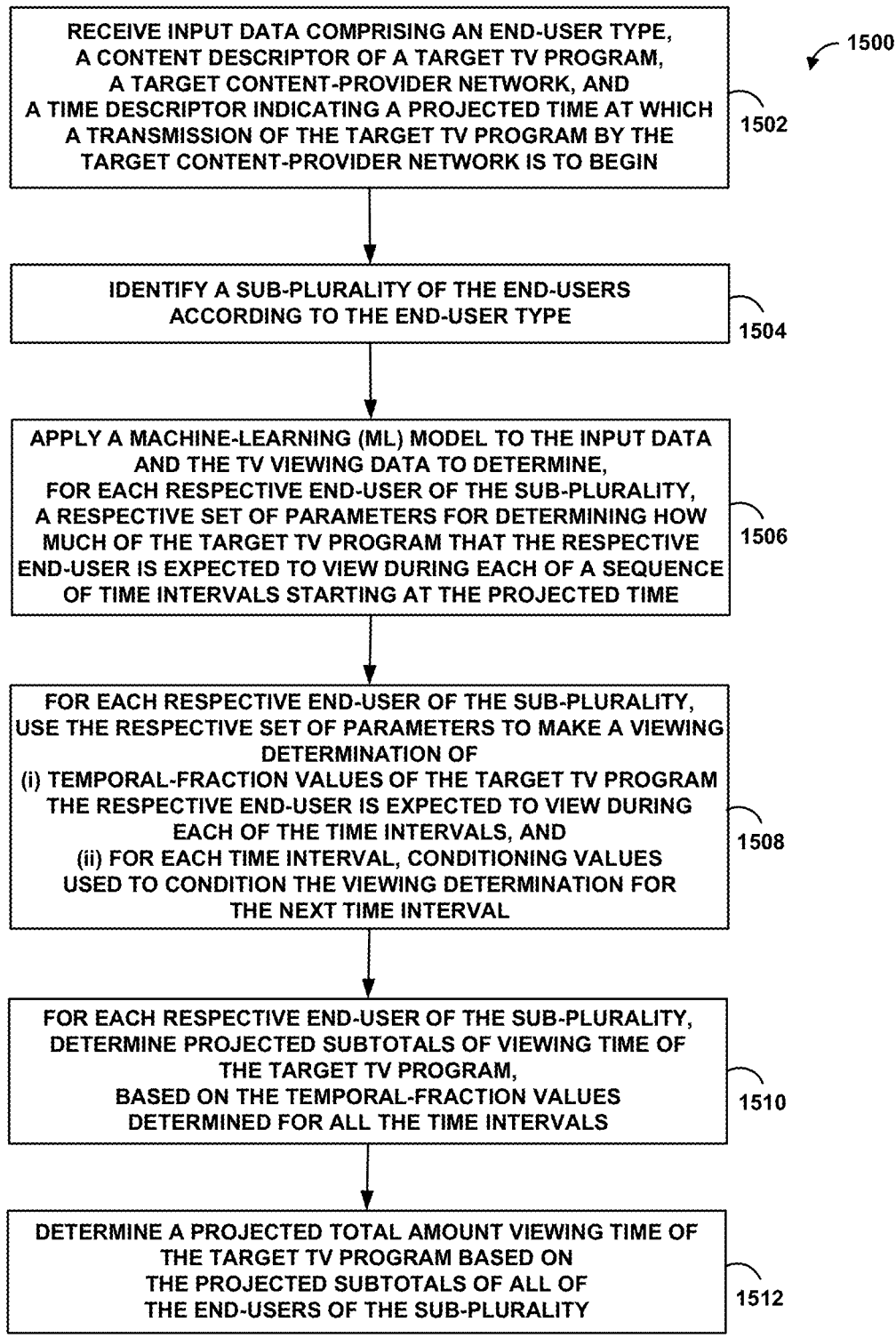
FIG. 15 is an example flow chart of an example method of respondent-level ratings prediction, in accordance with example embodiments.
Figure 16:
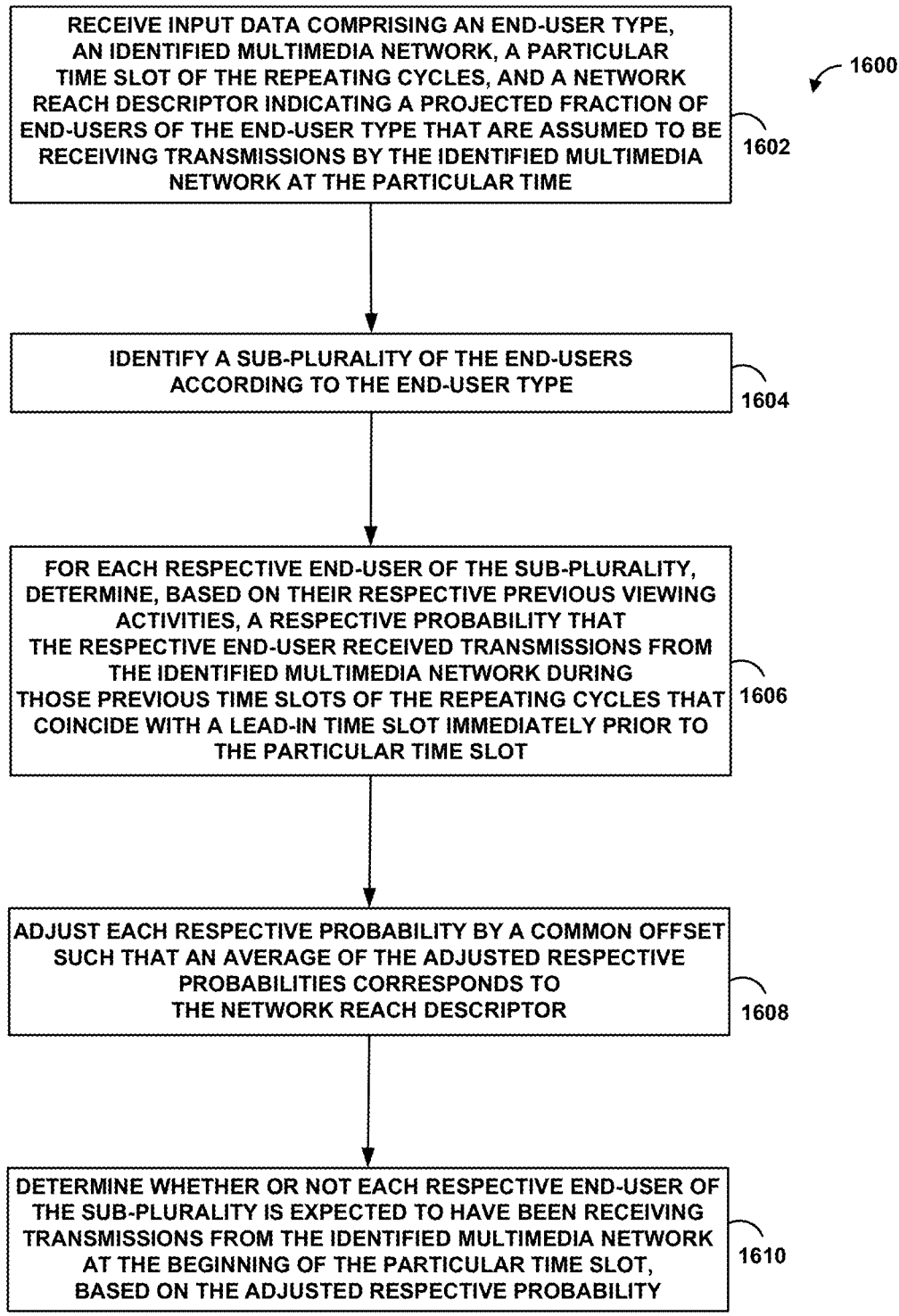
FIG. 16 is an example flow chart of an example method for determining conditioning for respondent-level ratings prediction, in accordance with example embodiments.

In accordance with example embodiments, operations and procedures of respondent level predictions of audience ratings and/or other performance metrics, described by way of example above, may be implemented as methods on one or more computer devices or systems, such as those illustrated in FIGS. 4 and 5. FIG. 15 illustrates a flow chart of an example method 1500 for RLD probability model operations, such as those described above, for example. FIG. 16 illustrates a flow chart of an example method 1600 for sampled lead-in operations, also described above. Both methods 1500 and 1600 may be made operational as parts or components of a respondent level predictor system, such as RLD predictor system 300, for example. Both methods may be carried out by one or more computing devices or systems, such as those illustrated in FIGS. 4 and 5, for example. Additionally, both methods may be implemented as computer-readable instructions stored in one or another form of memory (such as volatile or nonvolatile memory) of one or more computing devices or systems. When executed by one or more processors of the one or more computing devices or systems, the instructions may cause the one or more computing devices or systems to carry out operations of the example methods 1500 and/or 1600. The computer-readable instructions may additionally be stored on a non-transitory computer readable medium, which may be used, for example, for distribution to one or more computing devices or systems, and/or for loading the instructions into the memory of the one or more computing devices or systems. In some examples, the non-transitory computer-readable medium could be the memory of one or more computing devices or systems. Example methods 1500 and 1600 are described below.

A. RLD Predictor Method

In accordance with example embodiments, method 1500 for RLD probability modeling may be implemented in a system, such as the RLD predictor system 300, as part of the ML model 302-1 and the RLD model 304, for example. The system may include persistent storage of television (TV) viewing data of a plurality of end-users who have received previous TV program transmissions over one or more content-provider networks. The persistent storage could be the viewing database 110, and the TV viewing data could be historical viewing data described above, for example. In an example, the end-users may be panelists described above. The TV viewing data may include program information for each TV program, such as transmission time and duration, content-provider network, and characterization of the TV program. The TV viewing data may further include end-user information comprising data characterizing end-users, such as demographic information, and their previous viewing activities, such as their historical viewing activities described above.

Block 1502 may involve the system receiving input data that includes an end-user type, a content descriptor of a target TV program, a target content-provider network, and a time descriptor indicating a projected time at which a transmission of the target TV program by the target content-provider network is to begin. An example of input data could be input data 301, for example. The end-user type could be information indicative of one or more demographic categories, and the content descriptor could be characterizing information about the target TV program, for example. The target TV show may be a new or planned show, as described above. Referring to the input data 301, the content descriptor could be the target show ID of an existing program, where the target TV program is considered to be characterized similarly to the existing program. The projected time could be the projected starting (first) bucket of the target TV show.

Block 1504 may involve identifying a sub-plurality of the end-users according to the end-user type. In an example, the sub-plurality of end-users could be panelists selected according to one or more categories of demographic information represented in the end-user type.

Block 1506 may involve applying a machine-learning (ML) model to the input data and the TV viewing data to determine, for each respective end-user of the sub-plurality, a respective set of parameters for determining how much of the target TV program that the respective end-user is expected to view during each of a sequence of time intervals starting at the projected time. In accordance with example embodiments, the parameters may be the probability distribution parameters discussed above, and the sequence of time intervals may be the buckets that span the target TV program.

Block 1508 may involve for each respective end-user of the sub-plurality, using the respective set of parameters to make a viewing determination of (i) temporal-fraction values of the target TV program the respective end-user is expected to view during each of the time intervals, and (ii) for each time interval, conditioning values used to condition the viewing determination for the next time interval. In accordance with example embodiments, the temporal-fraction values may be for each panelist the fraction of each bucket worth of the target TV that the panelist watches, computed according to the conditional probabilities in each bucket, as described above. The conditioning values may be the lead-in variables for the next bucket, as also discussed above.

Block 1510 for each respective end-user of the sub-plurality, determining projected subtotals of viewing time of the target TV program, based on the temporal-fraction values determined for all the time intervals. In accordance with example embodiments, the subtotals may be the total amount of the target TV program watched by each panelist as aggregate across all buckets, and represented in a distribution of samples.

Finally, block 1512 may involve determining a projected total amount viewing time of the target TV program based on the projected subtotals of all of the end-users of the sub-plurality. In accordance with example embodiments, this operation may involve generating the predicted ratings, as represented in the ratings distribution in FIG. 14, for example.

In accordance with example embodiments, the input data may further include a projected fraction of the sub-plurality of the end-users that are projected to be receiving content from the target content-provider network at the projected time. This may correspond to a target network reach, for example. The method 1500 may further include determining, for each respective end-user of the sub-plurality, based on their previous viewing activities and the projected fraction, TV-reach projections of whether or not the respective end-user is expected to be viewing any TV content at the projected time. TV-reach projections may correspond to the watched TV lead-in variables determined from a sampled lead-in procedure, for example. The method 1500 may also further include determining, for each respective end-user of the sub-plurality, based on their previous viewing activities and the projected fraction, network-reach projections of whether or not the respective end-user is expected to be viewing the target content-provider network at the projected time. Network-reach projections may correspond to the watched_network lead-in variables also determined from a sampled lead-in procedure, for example. The method 1500 may still further include, for each respective end-user of the sub-plurality, conditioning the viewing determination for the first time interval based on the TV-reach projections and the network-reach projections. This may correspond to applying the sampled lead-ins to the first bucket.

In accordance with example embodiments, the transmission time and duration may correspond to a time slot descriptor that specifies at least one of a day of week, time of day, month, or year, and may further indicate a duration descriptor that specifies a number of consecutive time segments and a duration of each time segment. In addition, the characterization of the TV program may include program metadata associated with the TV program, where the metadata may include at least a genre. Further the data characterizing end-users and their previous viewing activities may include, for each respective end-user of the plurality, demographic information and a viewing history over a multiplicity of consecutive time segments spanning a viewing timeline, and indicating, for each given time segment of the multiplicity, a fractional amount of the given time segment the respective end-user viewed any TV programming. For any non-zero fractional amount, an indication of what network and TV program was viewed may also be included. (It may be noted that the historical view data may include information about end-users even for times when they did not watch any TV.) The end-user type may include one or more categories of demographic information, the content classification descriptor may include one or more categories of program metadata, and the projected time may include a projected time slot that specifies at least one of a projected day of week, a projected time of day, a projected month, or a projected year. As noted above, time segments may correspond to buckets as used in the discussion above.

In accordance with example embodiments, applying the ML model to the input data and the TV viewing data to determine the respective set of parameters for each respective end-user of the sub-plurality may involve certain operations carried out for each respective end-user of the sub-plurality. Specifically, for each given time interval of the sequence, a determination may be made of a TV parameter of a first Bernoulli probability distribution for predicting whether or not the respective end-user will view any TV programming during the given time interval. In addition, for each given time interval of the sequence, a determination may be made of a program parameter of a second Bernoulli probability distribution for predicting whether or not the respective end-user will view any of the target TV programs during the given time interval. Further, for each given time interval of the sequence, a determination may be made of a total-program parameter of a third Bernoulli probability distribution for predicting whether or not the respective end-user will view all of that portion of the target TV program transmitted during the given time interval. Still further, for each given time interval of the sequence, a determination may be made of a parameter pair of a Beta probability distribution for predicting a fractional amount of the portion of the target TV program transmitted during the given time interval that the respective end-user will view.

In further accordance with example embodiments, using the respective set of parameters to make the viewing determination of the temporal-fraction values may involve performing a Monte Carlo simulation to generate an integer number M samples of binary values for each of the first, second, and third Bernoulli probability distributions, and also performing a Monte Carlo simulation to generate M samples of fractional values for the Beta probability distribution. Then, on a sample-by-sample basis, the M samples of binary values of the first, second, and third Bernoulli probability distributions may be applied as conditions to the M samples of fractional values of the Beta probability distribution to compute M samples of the temporal-fraction values.

In further accordance with example embodiments, for each given time interval of the sequence, each of the TV parameter, the program parameter, the total-program parameter, and the parameter pair may take on predetermined values according to a lead-in condition. The lead-in condition may be specified by: (i) whether or not the respective end-user is viewing any TV programming at the start of the given time interval, (ii) whether or not the respective end-user is viewing the target content-provider network at the start of the given time interval, and/or (iii) whether or not the respective end-user is viewing the target TV program at the start of the given time interval. Using the respective set of parameters to make the viewing determination of the temporal-fraction values may further involve, for each given time interval of the sequence, receiving M lead-in conditions that select, on a sample-by-sample basis, particular ones of the predetermined values of the parameters applied in the Monte Carlo simulations.

In further accordance with example embodiments, using the respective set of parameters to make the viewing determination of the conditioning values may involve, on a sample-by-sample basis, setting each of the M lead-in conditions for the next time interval to one or more of the binary values of the first, second, or third Bernoulli probability distributions of the current time interval.

In further accordance with example embodiments, the input data may further include a projected fraction of the sub-plurality of the end-users that are projected to be receiving content from the target content-provider network at the projected time. This may correspond to a target network reach, for example. Method 1500 may then further involve, for each respective end-user of the sub-plurality, determining M lead-in conditions for the first time interval of the sub-plurality, based on the previous viewing activities of the respective end-user and the projected fraction.

In accordance with example embodiments, the respective set of parameters may correspond to parameters of probability distributions predictive of a viewing fraction of the target TV program that the respective end-user is expected to view during each time interval of the sequence. Then, using the respective set of parameters to make the viewing determination of the temporal-fraction values may involve using probability distributions to compute a multiplicity of sample predictions of the viewing fraction in each of the time intervals, for each respective end-user of the sub-plurality. In addition, determining the projected subtotals of viewing time of the target TV program may involve multiplying all the sample predictions of the viewing fraction by a common duration of all the time intervals to convert all the sample predictions of viewing fraction into sample predictions of viewing time, and then for each respective end-user of the sub-plurality, on a sample-by-sample basis across corresponding multiplicities of the time intervals, summing sample predictions of viewing time across all of the time intervals to generate a multiplicity of aggregate viewing time predictions. Determining the projected total amount viewing time of the target TV program may then, on a sample-by-sample basis, computing a weighted average of the aggregate viewing time predictions of all the end-users of the sub-plurality. This may correspond to generation of the ratings distribution illustrated in FIG. 14, for example.

B. Sampled Lead-In Method

In accordance with example embodiments, method 1600 for sampled lead-in operations may be implemented in a system, such as the RLD predictor system 300, as part of the sampled lead-in generator 302-2, for example. The system may include persistent storage of television (TV) viewing data of a plurality of end-users who have received previous TV program transmissions over one or more content-provider networks. The persistent storage could be the viewing database 110, and the TV viewing data could be historical viewing data described above, for example. In an example, the end-users may be panelists described above. The TV viewing data may include program information for each TV program, such as transmission time and duration, content-provider network, and characterization of the TV program. The TV viewing data may further include end-user information comprising data characterizing end-users, such as demographic information, and their previous viewing activities, such as their historical viewing activities described above.

Block 1602 may involve the system receiving input data including an end-user type, an identified multimedia network, a particular time slot of the repeating cycles, and a network reach descriptor indicating a projected fraction of end-users of the end-user type that are assumed to be receiving transmissions by the identified multimedia network at the particular time slot. An example of input data could be input data 301, for example. Referring to the input data 301, the end-user type could be information indicative of one or more demographic categories in the panelist descriptor, for example. The identified multimedia network could correspond to the target network, and the particular time slot of the repeating cycles could correspond to the projected start time, for example. The network reach descriptor could be the target network reach, for example.

Block 1604 may involve identifying a sub-plurality of the end-users according to the end-user type. In an example, the sub-plurality of end-users could be panelists selected according to one or more categories of demographic information represented in the end-user type.

Block 1606 may involve for each respective end-user of the sub-plurality, determining, based on their respective previous viewing activities, a respective probability that the respective end-user received transmissions from the identified multimedia network during those previous time slots of the repeating cycles that coincide with a lead-in time slot immediately prior to the particular time slot. This could correspond to determining $p_i^h$, for example.

Block 1608 may involve adjusting each respective probability by a common offset such that an average of the adjusted respective probabilities corresponds to the network reach descriptor. This may correspond to determining and applying $\delta$ to $p_i^h$ as described above in connection with equation (10) and related operations, for example.

Finally, block 1610 may involve determining whether or not each respective end-user of the sub-plurality is expected to have been receiving transmissions from the identified multimedia network at the beginning of a particular time slot, based on the adjusted respective probability. This may correspond to determining at least the watched_network lead-in variables for each panelist.

In accordance with example embodiments, each time slot may specify a duration and at least one of a day of week, time of day, month, or year, and the data characterizing end-users and their previous viewing activities may include, for each respective end-user of the plurality, demographic information and a viewing history over a multiplicity of consecutive time slots spanning a viewing timeline. The viewing history may indicate, for each given time slot of the multiplicity, a fractional amount of the duration that the respective end-user viewed any TV programming. For any non-zero fractional amount, an indication of what network and TV program was viewed may also be included. The end-user type may include one or more categories of demographic information. The particular time slot may specify at least one of a particular day of week, a particular time of day, a particular month, or a particular year. As noted above, time slots may correspond to buckets as used in the discussion above.

In accordance with example embodiments, the repeating cycles of time slots may span a respective historical viewing timeline for each respective end-user of the plurality, and within each respective historical viewing timeline, the time slots of the repeating cycles that coincide with the lead-in time slot may form a respective historical set of lead-in time slots. Determining the respective probability that the respective end-user received transmissions from the identified multimedia network during those previous time slots of the repeating cycles that coincide with the lead-in time slot may then involve determining a respective historical network lead-in probability corresponding to a number of time slots of the respective historical set of lead-in time slots during which the respective end-user viewed TV content transmitted by the identified multimedia network relative to a total number of time slots in the respective historical viewing timeline. This could correspond to an example of determining $p_i^h$ as a straight average, as described above, for example, where an end-user receiving transmissions from a given network corresponds to a panelist watching the given network.

In accordance with example embodiments, the respective historical network lead-in probability may alternatively be determined probabilistically. Specifically, for each respective end-user of the sub-plurality, certain operations may be carried out. The operations may include computing (i) a first respective sample prediction from a first Beta distribution parameterized by a respective TV-number of time slots of the respective historical set of lead-in time slots during which the respective end-user viewed any TV content from any multimedia network, and (ii) a respective non-TV-number of time slots of the respective historical set of lead-in time slots during which the respective end-user did not view any TV content. The operations may also include computing (iii) a second respective sample prediction from a second Beta distribution parameterized by a respective network-number of time slots of the respective historical set of lead-in time slots set during which the respective end-user viewed TV content transmitted by the identified multimedia network, and (iv) a respective non-network-number of time slots of the respective historical set of lead-in time slots during which the respective end-user viewed any TV content from any multimedia network except from the identified multimedia network. The respective historical network lead-in probability may then be computed as a product of the first respective sample prediction and the second respective sample prediction.

In further accordance with example embodiments, adjusting each respective probability by the common offset such that the average of the adjusted respective probabilities corresponds to the network reach descriptor may involve computing a shift value as a difference between the network reach descriptor and a weighted average of the respective historical network lead-in probabilities of the respective end-users of the sub-plurality, then carrying out a further iteration. The further iteration may involve computing respective shifted network lead-in probabilities for the respective end-users of the sub-plurality by adding the shift value to the respective historical network lead-in probabilities, and clamping any respective shifted network lead-in probability that falls outside a range from zero to one, inclusive, to zero or one according to which end of the range is overflowed. The iteration may further involve, for any respective shifted network lead-in probability that falls outside the range prior to clamping, determining a respective residual corresponding to a respective overflow amount, and recomputing the respective shifted network lead-in probabilities by additively distributing a sum of all the respective residuals among at least a subset of the respective shifted network lead-in probabilities. Then, if a threshold condition is not met, the respective historical network lead-in probabilities may be replaced with the recomputed respective shifted network lead-in probabilities and repeating the iteration. The threshold condition is at least one of: the sum of all the respective residuals falling below a residual threshold value, or a number of iterations exceeding a maximum iteration value. These operations may correspond to the redistribution and clamping procedure described above.

In accordance with example embodiments, there may be N end-users in the sub-plurality. Determining whether or not each respective end-user of the sub-plurality would have been expected to be receiving transmissions from the identified multimedia network at the particular time slot, based on the adjusted respective probability may then involve, for each respective end-user of the sub-plurality, performing a Monte Carlo simulation to generate an integer number M network-samples of binary values from a respective network Bernoulli probability distribution parameterized by the adjusted respective probability. Each binary value may signify whether or not the respective end-user of the sub-plurality would have been expected to be receiving transmissions from the identified multimedia network at the particular time slot, where an end-user receiving transmissions from a given network corresponds to a panelist watching the given network. Next, an N-row by M-column network array of sample binary values from the M network-samples of the respective end-users of the sub-plurality may be formed, where each row of the network array corresponds to the M network-samples of a different one of the respective end-users, and each column corresponds to one network sample of each of the N end-users. A respective weighted average of each respective column of the network array may next be computed. An iteration may then be carried out until a threshold condition is met. The iteration may involve certain operations, including, for all respective weighted averages that are not within a threshold tolerance of the network reach descriptor, replacing each of the corresponding respective columns with N network-samples of binary values, each being a single draw from a different one of the respective network Bernoulli probability distributions. The operations may also include recomputing a respective weighted average for each column replaced in the current iteration, and repeating the iteration. The threshold condition may be at least one of: all the respective weighted averages of all N columns being within the threshold tolerance of the network reach descriptor, or a number of iterations exceeding a maximum iteration value. These operations may correspond to rejection/re-sampling/replacement procedure described above.

In accordance with example embodiments, method 1600 may further involve additional operations, including, for each respective end-user of the sub-plurality, determining a respective historical TV lead-in probability corresponding to a number of time slots of the respective historical set of lead-in time slots during which the respective end-user viewed TV content transmitted by the any multimedia network relative to the total number of time slots in the respective historical viewing timeline. The additional operations may also include, for each respective end-user of the sub-plurality, performing a Monte Carlo simulation to generate an integer number M TV-samples of binary values from a respective TV Bernoulli probability distribution parameterized by the respective historical TV lead-in probability, wherein each binary value signifies whether or not the respective end-user of the sub-plurality would have been expected to be receiving transmissions from any multimedia network at the particular time slot. An end-user receiving transmissions from a given network may correspond to a panelist watching the given network The additional operations may further include, forming an N-row by M-column TV array of sample binary values from the M TV-samples of the respective end-users of the sub-plurality, where each row of the network array corresponds to the M TV-samples of a different one of the respective end-users, and each column corresponds to one sample of each of the N end-users, and then replacing each element of the TV array for which the corresponding element of the network array has a value of one. An N-row by M-column lead-in array may then be formed, where each element is a three-element lead-in vector, wherein one element is the value of the corresponding element of the TV array, and the other two elements are both the value of the corresponding element of the network array, and wherein each row of the lead-in array corresponds to M sample lead-in vectors for a different one of the N end-users of the sub-plurality. These operations may correspond to forming the lead-in vector array, such as that illustrated in FIG. 12, for example.

In accordance with example embodiments, the computing system may further include an implementation of a computational model for predicting a fractional amount of time of each of a sequence of consecutive time slots of a particular TV program, transmitted by a particular multimedia network, starting at a first time slot, that each of the sub-plurality of end-users is expected to view. This may correspond to the ML model 302-1 and the RLD model 304, and the probability modeling operations described above, for example. For each end-user of the sub-plurality, the model may perform Monte Carlo simulations in each respective time slot of the sequence to generate M samples of each of a set of probability distributions for computing the fractional amount of time in the respective time slot, where the Monte Carlo simulations in each respective time slot are conditioned on the M samples from the probability distributions of the previous time slot, and where the lead-in array is generated for the first time slot being set to the particular time slot. The method 1600 may then further involve applying the lead-in array as initial conditions for the Monte Carlo simulations in the first time slot.

In accordance with example embodiments, the computing system may further include an implementation of a computational model for predicting a fractional amount of time of each of a sequence of consecutive time slots of a particular TV program, transmitted by a particular multimedia network, starting at a first time slot, that each of the sub-plurality of end-users is expected to view. Again, this may correspond to the ML model 302-1 and the RLD model 304, and the probability modeling operations described above, for example. For each end-user of the sub-plurality, the model may perform Monte Carlo simulations in each respective time slot of the sequence to generate an integer number M samples from each of a set of probability distributions for computing the fractional amount of time in the respective time slot, where the Monte Carlo simulations in each respective time slot are conditioned on the M samples of the probability distributions of the previous time slot. Then, determining whether or not each respective end-user of the sub-plurality is expected to have been receiving transmissions from the identified multimedia network at the particular time slot may involve generating M samples of lead-in conditions for each respective end-user of the sub-plurality, where each sample may include an indication of whether or not the respective end-user is expected to have been receiving, at the first time slot, transmissions from both: (i) the identified multimedia network, and (ii) any multimedia network. The method 1600 may then further involve applying the M samples of lead-in conditions for each of the respective end-users of the sub-plurality as initial conditions for the Monte Carlo simulations in the first time slot.

V. Example Variations

Although the examples and features described above have been described in connection with specific entities and specific operations, in practice, there are likely to be many instances of these entities and many instances of these operations being performed, perhaps contemporaneously or simultaneously, on a large scale.

In addition, although some of the acts described in this disclosure have been described as being performed by a particular entity, the acts can be performed by any entity, such as those entities described in this disclosure. Further, although the acts have been recited in a particular order, the acts need not be performed in the order recited. However, in some instances, it can be desired to perform the acts in the order recited. Further, each of the acts can be performed responsive to one or more of the other acts. Also, not all of the acts need to be performed to achieve one or more of the benefits provided by the disclosed features, and therefore not all of the acts are required.

And although certain variations have been described in connection with one or more examples of this disclosure, these variations can also be applied to some or all of the other examples of this disclosure as well.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A system comprising:
    persistent storage having stored thereon television (TV) viewing data of a plurality of end-users who have received previous TV program transmissions over one or more content-provider networks, wherein the TV viewing data includes program information for each TV program comprising transmission time and duration, content-provider network, and characterization of the TV program, and wherein the TV viewing data further includes end-user information comprising data characterizing end-users and their previous viewing activities;

one or more processors; and memory storing instructions that, when executed by the one or more processors, cause the system to carry out operations including:

receiving input data comprising an end-user type, a content descriptor of a target TV program, a target content-provider network, and a time descriptor indicating a projected time at which a transmission of the target TV program by the target content-provider network is to begin;

identifying a sub-plurality of the end-users according to the end-user type;

applying a machine-learning (ML) model to the input data and the TV viewing data to determine, for each respective end-user of the sub-plurality, a respective set of parameters for determining how much of the target TV program that the respective end-user is expected to view during each of a sequence of time intervals starting at the projected time;

for each respective end-user of the sub-plurality, using the respective set of parameters to make a viewing determination of (i) temporal-fraction values of the target TV program the respective end-user is expected to view during each of the time intervals, and (ii) for each time interval, conditioning values used to condition the viewing determination for a next time interval;

for each respective end-user of the sub-plurality, determining projected subtotals of viewing time of the target TV program, based on the temporal-fraction values determined for all the time intervals; and determining a projected total amount viewing time of the target TV program based on the projected subtotals of all of the end-users of the sub-plurality.

2. The system of claim 1, wherein the input data further comprise a projected fraction of the sub-plurality of the end-users that are projected to be receiving content from the target content-provider network at the projected time, and wherein the operations further include:

determining, for each respective end-user of the sub-plurality, based on their previous viewing activities and the projected fraction, TV-reach projections of whether or not the respective end-user is expected to be viewing any TV content at the projected time;

determining, for each respective end-user of the sub-plurality, based on their previous viewing activities and the projected fraction, network-reach projections of whether or not the respective end-user is expected to be viewing the target content-provider network at the projected time; and for each respective end-user of the sub-plurality, conditioning the viewing determination for the first time interval based on the TV-reach projections and the network-reach projections.

3. The system of claim 1, wherein the transmission time and duration comprises a time slot descriptor that specifies at least one of a day of week, time of day, month, or year, and further comprises a duration descriptor that specifies a number of consecutive time segments and a duration of each time segment, wherein the characterization of the TV program comprises program metadata associated with the TV program, the metadata including at least genre, wherein the data characterizing end-users and their previous viewing activities comprise, for each respective end-user of the plurality, demographic information and a viewing history over a multiplicity of consecutive time segments spanning a viewing timeline, and indicating, for each given time segment of the multiplicity, a fractional amount of the given time segment the respective end-user viewed any TV programming, and what network and TV program was viewed for any non-zero fractional amount, and wherein the end-user type comprises one or more categories of demographic information, a content classification descriptor comprises one or more categories of program metadata, and the projected time comprises a projected time slot that specifies at least one of a projected day of week, a projected time of day, a projected month, or a projected year.

4. The system of claim 1, wherein applying the ML model to the input data and the TV viewing data to determine the respective set of parameters for each respective end-user of the sub-plurality comprises, for each respective end-user of the sub-plurality:

for each given time interval of the sequence, determining a TV parameter of a first Bernoulli probability distribution for predicting whether or not the respective end-user will view any TV programming during the given time interval;

for each given time interval of the sequence, determining a program parameter of a second Bernoulli probability distribution for predicting whether or not the respective end-user will view any of the target TV program during the given time interval;

for each given time interval of the sequence, determining a total-program parameter of a third Bernoulli probability distribution for predicting whether or not the respective end-user will view all of that portion of the target TV program transmitted during the given time interval; and for each given time interval of the sequence, determining a parameter pair of a Beta probability distribution for predicting a fractional amount of the portion of the target TV program transmitted during the given time interval that the respective end-user will view.

5. The system of claim 4, wherein using the respective set of parameters to make the viewing determination of the temporal-fraction values comprises:

performing a Monte Carlo simulation to generate an integer number M samples of binary values for each of the first, second, and third Bernoulli probability distributions;

performing a Monte Carlo simulation to generate M samples of fractional values for the Beta probability distribution; and on a sample-by-sample basis, applying the M samples of binary values of the first, second, and third Bernoulli probability distributions as conditions to the M samples of fractional values of the Beta probability distribution to compute M samples of the temporal-fraction values.

6. The system of claim 5, wherein, for each given time interval of the sequence, each of the TV parameter, the program parameter, the total-program parameter, and the parameter pair take on predetermined values according to a lead-in condition specified by at least one of: whether or not the respective end-user is viewing any TV programming at the start of the given time interval, whether or not the respective end-user is viewing the target content-provider network at the start of the given time interval, or whether or not the respective end-user is viewing the target TV program at the start of the given time interval, and wherein using the respective set of parameters to make the viewing determination of the temporal-fraction values further comprises, for each given time interval of the sequence, receiving M lead-in conditions that select, on a sample-by-sample basis, particular ones of the predetermined values of the parameters applied in the Monte Carlo simulations.

7. The system of claim 6, wherein using the respective set of parameters to make the viewing determination of the conditioning values comprises, on a sample-by-sample basis, setting each of the M lead-in conditions for the next time interval to one or more of the binary values of the first, second, or third Bernoulli probability distributions of the current time interval.

8. The system of claim 6, wherein the input data further comprise a projected fraction of the sub-plurality of the end-users that are projected to be receiving content from the target content-provider network at the projected time, and wherein the operations further include:
for each respective end-user of the sub-plurality, determining M lead-in conditions for the first time interval of the sub-plurality, based on the previous viewing activities of the respective end-user and the projected fraction.

9. The system of claim 1, wherein the respective set of parameters comprises parameters of probability distributions predictive of a viewing fraction of the target TV program that the respective end-user of the sub-plurality is expected to view during each time interval of the sequence, wherein using the respective set of parameters to make the viewing determination of the temporal-fraction values comprises using probability distributions to compute a multiplicity of sample predictions of the viewing fraction in each of the time intervals, for each respective end-user of the sub-plurality, wherein determining the projected subtotals of viewing time of the target TV program comprises:
multiplying all the sample predictions of the viewing fraction by a common duration of all the time intervals to convert all the sample predictions of viewing fraction into sample predictions of viewing time; and
for each respective end-user of the sub-plurality, on a sample-by-sample basis across corresponding multiplicities of the time intervals, summing sample predictions of viewing time across all of the time intervals to generate a multiplicity of aggregate viewing time predictions, and wherein determining the projected total amount viewing time of the target TV program comprises, on a sample-by-sample basis, computing a weighted average of the aggregate viewing time predictions of all the end-users of the sub-plurality.

10. A method carried out by a computing system having access to persistent storage having stored thereon television (TV) viewing data of a plurality of end-users who have received previous TV program transmissions over one or more content-provider networks, wherein the TV viewing data includes program information for each TV program comprising transmission time and duration, content-provider network, and characterization of the TV program, and wherein the TV viewing data further includes end-user information comprising data characterizing end-users and their previous viewing activities, wherein the method comprises:
receiving input data comprising an end-user type, a content descriptor of a target TV program, a target content-provider network, and a time descriptor indicating a projected time at which a transmission of the target TV program by the target content-provider network is to begin;
identifying a sub-plurality of the end-users according to the end-user type;
applying a machine-learning (ML) model to the input data and the TV viewing data to determine, for each respective end-user of the sub-plurality, a respective set of parameters for determining how much of the target TV program that the respective end-user is expected to view during each of a sequence of time intervals starting at the projected time;
for each respective end-user of the sub-plurality, using the respective set of parameters to make a viewing determination of (i) temporal-fraction values of the target TV program the respective end-user is expected to view during each of the time intervals, and (ii) for each time interval, conditioning values used to condition the viewing determination for a next time interval;
for each respective end-user of the sub-plurality, determining projected subtotals of viewing time of the target TV program, based on the temporal-fraction values determined for all the time intervals; and
determining a projected total amount viewing time of the target TV program based on the projected subtotals of all of the end-users of the sub-plurality.

11. The method of claim 10, wherein the input data further comprise a projected fraction of the sub-plurality of the end-users that are projected to be receiving content from the target content-provider network at the projected time, and wherein the method further comprises:
determining, for each respective end-user of the sub-plurality, based on their previous viewing activities and the projected fraction, TV-reach projections of whether or not the respective end-user is expected to be viewing any TV content at the projected time;
determining, for each respective end-user of the sub-plurality, based on their previous viewing activities and the projected fraction, network-reach projections of whether or not the respective end-user is expected to be viewing the target content-provider network at the projected time; and
for each respective end-user of the sub-plurality, conditioning the viewing determination for the first time interval based on the TV-reach projections and the network-reach projections.

12. The method of claim 10, wherein the transmission time and duration comprises a time slot descriptor that specifies at least one of a day of week, time of day, month, or year, and further comprises a duration descriptor that specifies a number of consecutive time segments and a duration of each time segment, wherein the characterization of the TV program comprises program metadata associated with the TV program, the metadata including at least genre,
wherein the data characterizing end-users and their previous viewing activities comprise, for each respective end-user of the plurality, demographic information and a viewing history over a multiplicity of consecutive time segments spanning a viewing timeline, and indicating, for each given time segment of the multiplicity, a fractional amount of the given time segment the respective end-user viewed any TV programming, and what network and TV program was viewed for any non-zero fractional amount, and wherein the end-user type comprises one or more categories of demographic information, a content classification descriptor comprises one or more categories of program metadata, and the projected time comprises a projected time slot that specifies at least one of a projected day of week, a projected time of day, a projected month, or a projected year.

13. The method of claim 10, wherein applying the ML model to the input data and the TV viewing data to determine the respective set of parameters for each respective end-user of the sub-plurality comprises, for each respective end-user of the sub-plurality:

for each given time interval of the sequence, determining a TV parameter of a first Bernoulli probability distribution for predicting whether or not the respective end-user will view any TV programming during the given time interval;

for each given time interval of the sequence, determining a program parameter of a second Bernoulli probability distribution for predicting whether or not the respective end-user will view any of the target TV program during the given time interval;

for each given time interval of the sequence, determining a total-program parameter of a third Bernoulli probability distribution for predicting whether or not the respective end-user will view all of that portion of the target TV program transmitted during the given time interval; and for each given time interval of the sequence, determining a parameter pair of a Beta probability distribution for predicting a fractional amount of the portion of the target TV program transmitted during the given time interval that the respective end-user will view.

14. The method of claim 13, wherein using the respective set of parameters to make the viewing determination of the temporal-fraction values comprises:

performing a Monte Carlo simulation to generate an integer number M samples of binary values for each of the first, second, and third Bernoulli probability distributions;

performing a Monte Carlo simulation to generate M samples of fractional values for the Beta probability distribution; and on a sample-by-sample basis, applying the M samples of binary values of the first, second, and third Bernoulli probability distributions as conditions to the M samples of fractional values of the Beta probability distribution to compute M samples of the temporal-fraction values.

15. The method of claim 14, wherein, for each given time interval of the sequence, each of the TV parameter, the program parameter, the total-program parameter, and the parameter pair take on predetermined values according to a lead-in condition specified by at least one of: whether or not the respective end-user is viewing any TV programming at the start of the given time interval, whether or not the respective end-user is viewing the target content-provider network at the start of the given time interval, or whether or not the respective end-user is viewing the target TV program at the start of the given time interval, and wherein using the respective set of parameters to make the viewing determination of the temporal-fraction values further comprises, for each given time interval of the sequence, receiving M lead-in conditions that select, on a sample-by-sample basis, particular ones of the predetermined values of the parameters applied in the Monte Carlo simulations.

16. The method of claim 15, wherein using the respective set of parameters to make the viewing determination of the conditioning values comprises, on a sample-by-sample basis, setting each of the M lead-in conditions for the next time interval to one or more of the binary values of the first, second, or third Bernoulli probability distributions of the current time interval.

17. The method of claim 15, wherein the input data further comprise a projected fraction of the sub-plurality of the end-users that are projected to be receiving content from the target content-provider network at the projected time, and wherein the method further comprises:

for each respective end-user of the sub-plurality, determining M lead-in conditions for the first time interval of the sub-plurality, based on the previous viewing activities of the respective end-user and the projected fraction.

18. The method of claim 10, wherein the respective set of parameters comprises parameters of probability distributions predictive of a viewing fraction of the target TV program that the respective end-user is expected to view during each time interval of the sequence, wherein using the respective set of parameters to make the viewing determination of the temporal-fraction values comprises using probability distributions to compute a multiplicity of sample predictions of the viewing fraction in each of the time intervals, for each respective end-user of the sub-plurality, wherein determining the projected subtotals of viewing time of the target TV program comprises:

multiplying all the sample predictions of the viewing fraction by a common duration of all the time intervals to convert all the sample predictions of viewing fraction into sample predictions of viewing time; and for each respective end-user of the sub-plurality, on a sample-by-sample basis across corresponding multiplicities of the time intervals, summing sample predictions of viewing time across all of the time intervals to generate a multiplicity of aggregate viewing time predictions, and wherein determining the projected total amount viewing time of the target TV program comprises, on a sample-by-sample basis, computing a weighted average of the aggregate viewing time predictions of all the end-users of the sub-plurality.

19. A non-transitory computer-readable medium having instructions stored thereon that, when carried out by one or more processors of a computing system comprising persistent storage having stored thereon television (TV) viewing data of a plurality of end-users who have received previous TV program transmissions over one or more content-provider networks, wherein the TV viewing data includes program information for each TV program comprising transmission time and duration, content-provider network, and characterization of the TV program, and wherein the TV viewing data further includes end-user information comprising data characterizing end-users and their previous viewing activities, cause the computing system to carry out operations including:

receiving input data comprising an end-user type, a content descriptor of a target TV program, a target content-provider network, and a time descriptor indicating a projected time at which a transmission of the target TV program by the target content-provider network is to begin;

identifying a sub-plurality of the end-users according to the end-user type;

applying a machine-learning (ML) model to the input data and the TV viewing data to determine, for each respective end-user of the sub-plurality, a respective set of parameters for determining how much of the target TV program that the respective end-user is expected to view during each of a sequence of time intervals starting at the projected time;

for each respective end-user of the sub-plurality, using the respective set of parameters to make a viewing determination of (i) temporal-fraction values of the target TV program the respective end-user is expected to view during each of the time intervals, and (ii) for each time interval, conditioning values used to condition the viewing determination for a next time interval;

for each respective end-user of the sub-plurality, determining projected subtotals of viewing time of the target TV program, based on the temporal-fraction values determined for all the time intervals;

and determining a projected total amount viewing time of the target TV program based on the projected subtotals of all of the end-users of the sub-plurality.

20. The non-transitory computer-readable medium of claim 19, wherein the input data further comprise a projected fraction of the sub-plurality of the end-users that are projected to be receiving content from the target content-provider network at the projected time, and wherein the operations further include:

determining, for each respective end-user of the sub-plurality, based on their previous viewing activities and the projected fraction, TV-reach projections of whether or not the respective end-user is expected to be viewing any TV content at the projected time;

determining, for each respective end-user of the sub-plurality, based on their previous viewing activities and the projected fraction, network-reach projections of whether or not the respective end-user is expected to be viewing the target content-provider network at the projected time; and for each respective end-user of the sub-plurality, conditioning the viewing determination for the first time interval based on the TV-reach projections and the network-reach projections.

* * * * *